United States Patent [19]

Perlman

[11] Patent Number: 5,558,339
[45] Date of Patent: Sep. 24, 1996

[54] NETWORK ARCHITECTURE TO SUPPORT RECORDING AND PLAYBACK OF REAL-TIME VIDEO GAMES

[76] Inventor: Stephen G. Perlman, 721 Tiana La., Mountain View, Calif. 94041

[21] Appl. No.: 238,303

[22] Filed: May 5, 1994

[51] Int. Cl.⁶ .................................................. A63F 9/24
[52] U.S. Cl. .............................. 463/42; 463/41; 463/23
[58] Field of Search ...................................... 273/433, 434, 273/435, 436, 437, 438, 439, 85 G, DIG. 28, 460; 434/118, 43, 236; 364/410

[56] References Cited

U.S. PATENT DOCUMENTS

| | | | |
|---|---|---|---|
| 4,342,454 | 8/1982 | Baer et al. | 273/85 G |
| 4,520,477 | 5/1985 | Wen . | |
| 4,572,509 | 2/1986 | Sitrick . | |
| 4,592,546 | 6/1986 | Fascenda et al. | 273/1 E |
| 4,799,635 | 1/1989 | Nakagawa | 364/900 |
| 4,941,829 | 7/1990 | Estes et al. | 434/118 |
| 4,980,897 | 12/1990 | Decker et al. | 375/38 |
| 4,998,199 | 3/1991 | Tashiro et al. . | |
| 5,013,038 | 5/1991 | Luxenberg et al. | 273/439 |
| 5,048,831 | 9/1991 | Sides . | |
| 5,070,479 | 12/1991 | Nakagawa | 395/575 |
| 5,083,800 | 1/1992 | Lockton | 273/439 |
| 5,112,051 | 5/1992 | Darling et al. . | |
| 5,120,076 | 6/1992 | Luxenberg et al. | 273/439 |
| 5,155,768 | 10/1992 | Matsuhara | 380/23 |
| 5,161,803 | 11/1992 | Ohara | 273/435 |
| 5,169,319 | 12/1992 | Potocki | 434/236 |
| 5,259,626 | 11/1993 | Ho | 273/438 |
| 5,261,820 | 11/1993 | Slye et al. | 434/43 |
| 5,291,189 | 3/1994 | Otake et al. | 340/799 |

FOREIGN PATENT DOCUMENTS

| | | |
|---|---|---|
| 0402067 | 6/1990 | European Pat. Off. . |
| 0481770 | 10/1991 | European Pat. Off. . |
| 0571213 | 5/1993 | European Pat. Off. . |
| 0571138 | 5/1993 | European Pat. Off. . |
| 9323125 | 11/1993 | United Kingdom . |

*Primary Examiner*—Jessica J. Harrison
*Attorney, Agent, or Firm*—Blakely, Sokoloff, Taylor & Zafman

[57] ABSTRACT

An apparatus and system for recording and replaying the interaction between a plurality of players of a video game is disclosed. The system of the present invention includes a computer for recording and replaying the interaction between a plurality of players of a video game, the computer comprises: 1) a network interface coupled to a network; 2) client application software executing in the computer, the client application software includes: a) processing logic for saving game information indicative of the interaction between a player of the plurality of players and a video game executing on the computer; b) processing logic for connecting the first computer to a server coupled to the network; and c) processing logic for uploading the game information to a server memory coupled to the server. The computer of the present invention also includes: a) processing logic for downloading the game information from a server memory coupled to the server; and b) processing logic for executing the video game on the computer using the game information in place of input from the player.

22 Claims, 22 Drawing Sheets

NETWORK ARCHITECTURE TO SUPPORT RECORDING AND PLAYBACK OF REAL-TIME VIDEO GAMES

CROSS-REFERENCE TO RELATED APPLICATIONS

The following co-pending U.S. patent applications relate to the present application. Each of the listed co-pending applications are assigned to the same assignee as the present application.

1) U.S. patent application Ser. No. 08/238,630, Filed May 5, 1994, and titled, "AN IMPROVED NETWORK ARCHITECTURE TO SUPPORT REAL-TIME VIDEO GAMES"
2) U.S. patent application Ser. No. 08/238,477, Filed May 5, 1994, and rifled, "AN IMPROVED NETWORK ARCHITECTURE TO SUPPORT MULTIPLE SITE REAL-TIME VIDEO GAMES"
3) U.S. patent application Ser. No. 08/238,456, Filed May 5, 1994, and titled, "AN IMPROVED MODEM TO SUPPORT MULTIPLE SITE CALL CONFERENCED DATA COMMUNICATIONS."
4) U.S. patent application Ser. No. 08/254,154, Filed Jun. 6, 1994, and titled, "IMPROVED VIDEO GAME ENHANCER WITH INTEGRAL MODEM AND SMART CARD INTERFACE"

BACKGROUND OF THE INVENTION

1. Field of the Invention

This invention is in the field of telecommunications, as it relates to interactive, multi-player computer games.

2. Description of Related Art

From the very first video games to those of today, many video games have been designed to be played by two or more players simultaneously. Perhaps the very first video game, "Pong," by ATARI™, Inc. involved two simultaneous players, each player located near the game console., and controlling one of the "paddles" to control an object on the screen.

Today, two decades later, several of the "Top Ten" home video games are designed for two or more players. Among them are MORTAL KOMBAT™ distributed by ACCLAIM™, Inc. and JOHN MADDEN FOOTBALL™ by "ELECTRONIC ARTS™", Inc., both for the "SEGA GENESIS™" video game system and the "SUPER NINTENDO ENTERTAINMENT SYSTEM™" video game system. Like the Pong game of long ago, these new games involve two or more players located near the game console and each holding a "game controller."

In recent years there have also been several examples of two-player games that are played remotely through a phone line without both players being in the same location. Examples of such games are F-14 COBRA™, which is designed for "MACINTOSH™" computers equipped with a modem and "BALLZ™" by P.F. MAGIC™, Inc. which is designed for Sega Genesis video game systems equipped with a modem. Such games function by having one copy of the game being played running on a game console (or personal computer) at each location. Synchronization information is passed along with game controller data through the modem (along with possibly additional sound or data), and the game runs synchronously at the two locations. Even though the two players may be hundreds or thousands of miles away, the game plays essentially as it would if the two players were in the same room.

It is important to make a distinction here between two types of remote multi-player games, "twitch" games and "non-real-time" games. Twitch games are games that require split-second game control by players and cannot tolerate arbitrary communication latencies or delays. Twitch games are by far the most popular category of video games—typically all Top Ten games are twitch games—and include games such as "MORTAL KOMBAT™", "JOHN MADDEN FOOTBALL™," "SONIC THE HEDGEHOG™," and "SUPER MARIO BROTHERS™." Typically, twitch games require less than 100 millisecond communications latency (i.e. delay for a player's action to take effect on the screen) for the games to be playable. Twitch games usually can not tolerate varying delays in communications latency.

Non-real-time games are games that are possible to play with substantial communications latency and with varying communications latency. Obvious games in this genre are "strategy" games such a chess and backgammon, but there are also moderate action games such as adventure games like "RETURN TO ZORK™" by "ACTIVISION™" or the "KING'S QUEST™" series from "SIERRA ON-LINE™". The "AT&T IMAGINATION NETWORK™" is an on-line service specializing in such non-real-time games. Non-real-time games make up a much smaller market than twitch games.

One would think that with the popularity of multi-player twitch games, on-line services such as the "IMAGINATION NETWORK™" would offer twitch games for their users. However, these services do not offer such games; because, it is not possible to achieve less than 100 milliseconds (msec) latency, or even consistent latency, given the architecture of current public-switched data networks. Because users may be calling in from anywhere in the United States, on-line services such as the "IMAGINATION NETWORK™" lease capacity on data-access networks such as "SPRINTNET™" and "TYM NET™". Such networks provide local dial-up modem pools throughout the United States, and then route large-capacity data lines (such as T1 lines) utilizing wide-area network (WAN) protocols (such as X.25 protocol) into the on-line service's computing facility.

There are substantial (and often unpredictable) latencies through such an architecture. Each modem in the communications chain introduces latencies as high as 20 or 30 msec (varying by modem manufacturer and model). The telephone network introduces latencies (although they are minimal within a local calling area). WANs introduce unpredictable latencies (as much as 1.5 seconds round-trip). In addition, the on-line service's computers themselves introduce latencies, typically increasing as the number of active users increases.

As a result, remote multi-player twitch games can only be played through a direct telephone connection of one player to another player, barring a major overhaul (requiring enormous capital investment) of the existing public access data networks. Consequently, on-line services are limited to hosting non-real-time multi-player games.

It should also be noted that public data access networks such as "SPRINTNET™" are quite expensive to use, costing up to $6 per hour per user to the service provider. Therefore, remote multi-player games played through an on-line service carry with them an overhead that does not exist when a direct local phone connection is made player-to-player—an overhead that necessitates high usage charges.

Given the popularity of multi-player twitch games, the relative low-cost of modems, and the potential of using the phone network to make an arbitrary pairing of players, one would expect that remote multi-player twitch games would be far more popular. As it turns out, however, without an on-line service hosting many simultaneous users, it is rather difficult to find a partner to play a multi-player game. The reason for this can be easily understood: If a given Player A sits down to play a remote multiplayer game, the following conditions must be true in order for Player A to find a second Player B. First, Player A must know Player B's phone number (or vice-versa). Secondly, Player B must be available and willing to play the game at the same time. Thirdly, Player B must have the same video game and, most likely, the same video game system (or personal computer).

In addition, the following conditions are also desirable for a satisfying game between remote players. First, Player B should be at a comparable skill level of Player A. Secondly, if there are multiple pairings of players (as in a tournament), there should be some means of keeping track of each player's standing.

Clearly, when multiple players are hosted by an on-line service such as the "IMAGINATION NETWORK™", all of the conditions listed above can be addressed. Because there are thousands of users, at any given time, there is always someone available to play a given multi-player game. Because users are already dialed up, there is no need for a Player A to know a Player B's phone number (an important privacy issue). Also, it is not difficult for an on-line service to maintain statistics about players, so it easy to provide player ranking and matching of comparable skill players.

Unfortunately, as discussed previously, it is not currently possible to play twitch games through existing on-line services. Consequently, there is no easy and reliable way to satisfy the conditions listed above for matching players of a remote multi-player twitch game.

A possible solution would be to post a fist of all players interested in a given remote multi-player game on an electronic bulletin board of an on-line service or in a publication. The list would include for each player a phone number, the times of the day desired for play, the game to play, the game machine the game is played on, and possibly a skill level and previous play statistics. There are clear difficulties with such an approach: 1) Phone number: For reasons of privacy, many users would not want to publish their phone numbers. This is especially true of parents of children. Children make up the bulk of video game players. Also, most users would want to limit their outgoing calls to local calls so as to minimize charges. However, there is no simple way to know if a call is a local call. Many calls within the same area code (such as 415) are long distance and many calls between areas codes (e.g. south 415 and north 408) are local. Even if a city is listed along with a phone number, people may not know for sure if that particular city counts as a long distance call. When people get involved playing twitch video games, hours can fly by—even a small long distance fee can become substantial. 2) Time to play: Just because a player lists a certain time to be available for play, there is no guarantee that the player will actually be there at the listed time. Exigencies come up, people (especially kids) forget, other household members tie up the phone. The phone could easily ring off the hook with would-be players trying to call in. Alternatively, even if a player is available as promised, there could be many would-be players attempting to call in to play. Callers might be disappointed with a busy signal, or worse, they might repeatedly activate Call Waiting, constantly interfering with the modem connection established with the first player to successfully call in. 3) Skill level. Because it is up to would-be players to call in themselves, there is no way to enforce comparable skill-level play. Skilled players could call up weak players just to easily defeat them, which could be a frustrating experience for the weak player. 4) Statistics: Because players would be relied upon to update their own statistics, there is no easy way to verify claims or resolve disputes between players. It would be very difficult to manage tournament play. And even in a non-tournament scenario, it would very difficult to provide a reliable means for matching up players of comparable skill levels since the actual results of games would always be in question. 5) Hardware compatibility: Modems are available from many different manufacturers, and each manufacturer has many different models. These different modems all exhibit varying behaviors, some significantly different, some subtly different. Furthermore, in the case of personal computers, there are significant differences between models and configurations of personal computers. Given these variables, it is often the case that users fail to get their modems to connect to other modems without technical assistance. Clearly, home-to-home dialing from one modem to another is fraught with potential difficulties. And without customer services (such as those provided by on-line services) there will be a high degree of user frustration.

To date, there are no mechanisms to provide automatic linking of users playing remote, multi-player twitch games, assuring inexpensive, private, convenient, and reliable connection. The invention described herein provides such an apparatus and method.

SUMMARY OF THE INVENTION

The present invention is an apparatus and method for linking multiple remote players of real-time games. The system of the present invention includes a first computer for directly linking the first computer with a second computer, the first computer comprises: 1) a network interface coupled to a network; 2) client application software executing in the first computer, the client application software includes: a) processing logic for connecting the first computer to a server on a network via the network interface; b) processing logic for requesting the server to match the first computer with a second computer using matching criteria; c) processing logic for receiving a network address of the second computer from the server; and d) processing logic for establishing a direct communication link with the second computer using the network address.

The present invention includes an apparatus and method for establishing a multiple site data communication link with a plurality of other computers on conferenced telephone line. The system of the present invention for linking a plurality of computers in a multiple site configuration comprises: 1) a network; 2) a first, second, and third computer coupled or previously coupled to the network; and 3) a server coupled to the network, the server includes: a) means for receiving a request for linking from the first computer; b) means for receiving a request for linking from the second computer; c) means for receiving a request for linking from the third computer; d) means for matching the first computer with the second computer and the third computer using matching criteria; e) means for sending a network address of the second computer and a network address of the third computer to the first computer; and the first computer further includes means for establishing a communication link with the second computer and the third computer.

The present invention also includes an apparatus and method for establishing a data communication link with a plurality of other modems on conferenced telephone line.

The modem of the present invention for establishing a data communication link with a plurality of other modems on a shared communication channel comprises: 1) means for transmitting data on a first modulation band on the shared communication channel; and 2) means for receiving data on a plurality of distinct modulation bands. The present invention also includes a voice and data modem for establishing a data communication link and a voice communication link with a plurality of other modems on a shared communication channel, the modem comprises: 1) a means for transmitting data on a first modulation band on the conferenced telephone line; 2) a means for receiving data on a plurality of distinct modulation bands; and 3) means for transceiving voice signals on a second modulation band, the second modulation band being associated with a frequency different from the first modulation band and the plurality of distinct modulation bands, the voice signals being transceived on the shared communication channel.

The present invention also includes an apparatus and system for recording and replaying the interaction between a plurality of players of a video game. The system of the present invention includes a computer for recording and replaying the interaction between a plurality of players of a video game, the computer comprises: 1) a network interface coupled to a network; 2) client application software executing in the computer, the client application software includes: a) processing logic for saving game information indicative of the interaction between a player of the plurality of players and a video game executing on the computer; b) processing logic for connecting the first computer to a server coupled to the network; and c) processing logic for uploading the game information to a server memory coupled to the server. The computer of the present invention also includes: a) processing logic for downloading the game information from a server memory coupled to the server; and b) processing logic for executing the video game on the computer using the game information in place of input from the player.

It is an object of the present invention to provide a system for matching multiple users of real-time games through existing on-line services. It is a further object of the present invention to provide a system for linking multiple real-time game players without requiring real-time game players to play across existing data access networks. It is a further object of the present invention to provide a system for linking multiple remote players of real-time games wherein the actual operation of the game occurs via a direct communication line.

These and other advantages of the present invention are fully described in the following detailed description of the preferred embodiment.

DETAILED DESCRIPTION OF THE PREFERRED EMBODIMENT

The present invention is an apparatus and method for linking multiple remote players of real-time games. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
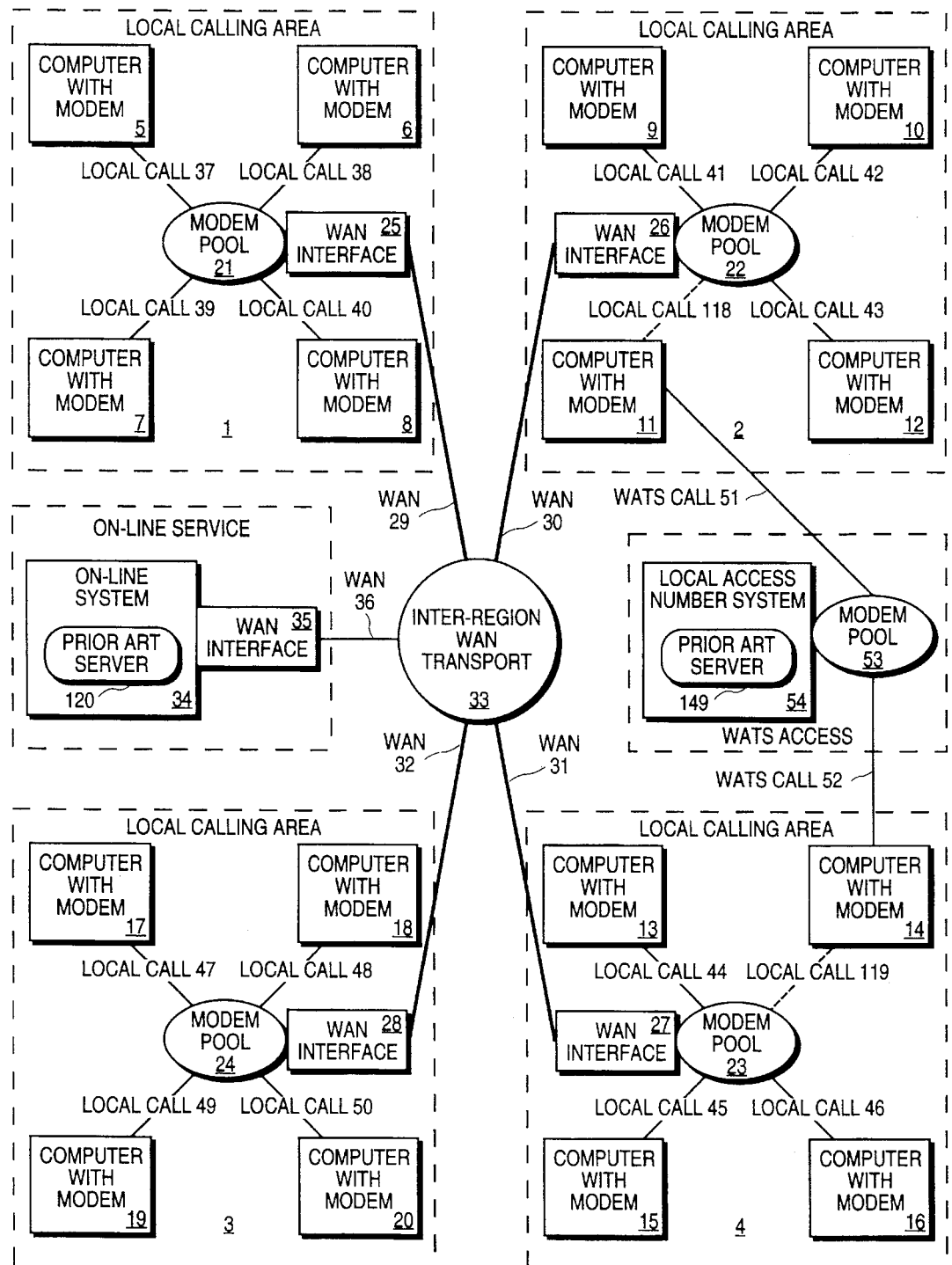
FIG. 1 illustrates the prior art consumer on-line service network architecture.

FIG. 1 is a diagram of a prior art network architecture commonly in use by a consumer on-line service such as "AMERICA ON-LINE™", the "IMAGINATION NETWORK™", and others. The on-line system 34 running server 120 (an on-line system running server software is collectively called hereinafter "server," and is identified in the figures by referencing the on-line system's identifying number) is at the center of such an on-line service and is a virtual multi-user time-sharing computer (typically implemented as a plurality of tightly-networked time-sharing computers) in much the same way as a traditional timesharing computer (e.g. "DIGITAL EQUIPMENT CORP. DECSYSTEM 20™" or "INTERNATIONAL BUSINESS MACHINES CORP. IBM 370™") from the 1960's or 1970's. Users with valid accounts log into the server in a manner explained below. The server provides interactive response to users, and users can access files in the server. Also, users can communicate with other users either on the server or through other networks (such as Internet) or other on-line systems.

Although today's consumer on-line services have made some improvements beyond traditional timesharing services (particularly in moving from "dumb" ASCII terminals to "smart" personal computers running "client application software" to provide a more sophisticated user interface), today's on-line services are still plagued with the burden of having literally thousands of simultaneous users all communicating with a single virtual server with the requirement to provide reasonable interactive responsiveness to all users. As an example, "AMERICA ON-LINE™" has been rapidly growing in popularity, yet they have been unable to continue to add computing capacity in their server to keep up with the demand. As a result, "AMERICA ON-LINE™" has become very sluggish during peak hours. In fact, the President of "AMERICA ON-LINE™" sent out an apology letter to all users about the sluggish response time due to their rapid growth.

Additionally, due to the geographic diversity of users and the impracticality of providing specialized communications lines into users' homes, today's on-line services typically use local calling areas (1–4) and modem pools (21–24). Modem pools are a plurality of modems accessible through a local phone number (37–50) to which computers with a modem (5–20) can dial in without a long-distance telephone toll charge. The data streams to and from modem pools (21–24) are typically multiplexed ("concentrated") into a shared packet-switched data stream which is communicated to a wide-area network ("WAN") 33 via lines (29–32) and WAN Interfaces (25–28). The WAN 33 provides nationwide (and often worldwide) data transport such that the server 34 through its WAN interface 35 connected to the WAN 36 has access to the concentrated data streams to and from all users (5–20) in all local calling areas (1–4). The network structure illustrated in FIG. 1 is well known to those of ordinary skill in the art.

Clearly, the architecture of FIG. 1 with multiple local modem pools provides significant efficiencies over a simpler time-sharing architecture with a modem pool dedicated to the server 34. Rather than have each user make a long-distance telephone call to the server 34, all calls are local. Although the WAN 33 certainly carries the data the same distance as a long-distance call would have, it carries the data digitally. Also, in a typical on-line session, a large percentage of the time is spent with no communications whatsoever or communications in only one direction, so the full two-way bandwidth is almost never utilized. Because bandwidth on the WAN 33 is only utilized for active (non-idle) data, the WAN 33 capacity is amortized across all users, most of whom are using far less than their theoretical maximum bandwidth. Finally, the same modem pools (21–24) are typically shared among many on-line services that can be reached through the WAN 33, further amortizing capacity across many users and on-line services. Thus, the architecture of FIG. 1 provides for relatively inexpensive communication costs, considering the sharing of capital equipment investment and telephone charges.

An example of a nationwide system implementing the architecture of FIG. 1 is "SPRINTNET™". "SPRINTNET™" has modem pools (21–24) in all major local calling areas in the United States, such as local calling areas (1–4), with WAN interfaces (25–28) that connect on lines (29–32) to a nationwide WAN 33 implemented using the X.25 protocol, a well-known communications standard. SprintNet provides communications for "AMERICA ON-LINE™", "IMAGINATION NETWORK™", and many other on-line services simultaneously with the same modem pools (21–24) and the same X.25 WAN 33.

Some on-line services (e.g. "AMERICA ON-LINE™") also provide special access for computers with modems (11, 14) via a Wide Area Telephone Service ("WATS," also known as "1- 800" service in the United States). Because the on-line service is charged for the duration of a user's call through a WATS line (51, 52), such service is typically provided only for a first-time dial-up so that the user can determine a local access number to a modem pool in the user's calling area. In this way, it is possible for the operators of an on-line service to distribute generic client application software with no knowledge of a given user's local calling area. Such client application software executing in computers (11, 14) directs a new user's computer (11, 14) to dial up a WATS number (51, 52) and connect to a central modem pool 53 accessible through that WATS number. Computers (11, 14) thereby communicate with a server 54 dedicated to the task of specifying local access numbers (and therefore local modem pool access numbers), given a user's area code. Subsequently, client application software executing in computers (11, 14) downloads one or more local access numbers from the server 54 and terminates the WATS call (51,52). From this point on, the local access number (e.g. in the case of computer 11, the phone number to call modem pool 22) is used to access the on-line service. Even though the WATS access does incur a charge to the on-line service, the actual WATS usage per customer is insignificant relative to the overall time the user spends using the on-line service.

Although the network architecture shown in FIG. 1 is efficient for many on-line services, it is neither efficient nor adequate for "twitch" multi-player networked video games.

"Twitch" video games are the category of video games that involve real-time, split-second response by the game player. We define twitch video games here as games requiring a consistent latency of less than 100 milliseconds (msec) between the moment the user actuates a controller and the moment the effect of that action is reflected in the game play on the video screen. (Indeed, we have found that 100 msec is a generous latency allowance; our tests have found that expert games players notice degraded play even when there is more than 50 msec of latency in fist-action games.) Almost all of the top ten selling video games in the United States are twitch games. Thus, the vast majority of the video game market fills in the category of twitch video games.

Considering the network architecture in FIG. 1, we can see several technical and economic obstacles to supporting multi-player twitch video games. These obstacles are listed roughly in order of severity.

1. WAN Latency. The round-trip latency of the nationwide packet-switched WAN 33 is often more than 500 msec. In the case of "SPRINTNET™" X.25 in particular, "SPRINTNET™" has specified a worst-case latency of over 1.5 seconds. Additionally, the latency is not always predictable. Sometimes it is under 500 msec, sometimes over 1000 msec. Even in the best case, the latency is too long for a twitch game.
2. Server 34 Architecture. A massive centralized time-sharing server 34 designed to support thousands of simultaneous users running remote interactive client application software is an inappropriate server architecture for a multi-player twitch game. The server 34 is optimized for receiving bursts of data coming in and returning bursts of data going out, with response time dependent on loading factors. The server 34 is not designed for routing steady, real-time, predictable streams of data among two or more users with minimal latency. Although it is conceivably possible to build a server 34 that would be suited for multi-player twitch games, it would be very difficult to do on a centralized basis and certainly on a national level. It is likely that such a centralized server 34 would be inefficient for non-twitch time-sharing services.

3. Economics. Although local-access modem pools are more economical than long-distance phone calls, they still are fairly expensive. These costs are particularly high during business hours (9-to-5 Monday through Friday). Most players of twitch games are children, who are likely to play during these peak hours after school. Even at off-hour charges (typically $1/hour), the costs can become significant for children who play several hours of video games per day.

4. Modem Latency. Modems themselves introduce latency (typically over 20 msec) to a data stream due to internal digital signal processing and processing of the raw bit stream. Between the modems of computers (5–20) and the modem pools (21–24), there are four modems between any two user. This results in typically over 80 msec of latency in modems alone.

The present invention is therefore an improved network architecture to support real-time multiple-player video games. An example of such a network architecture in use is shown in FIG. 2.

Figure 2:
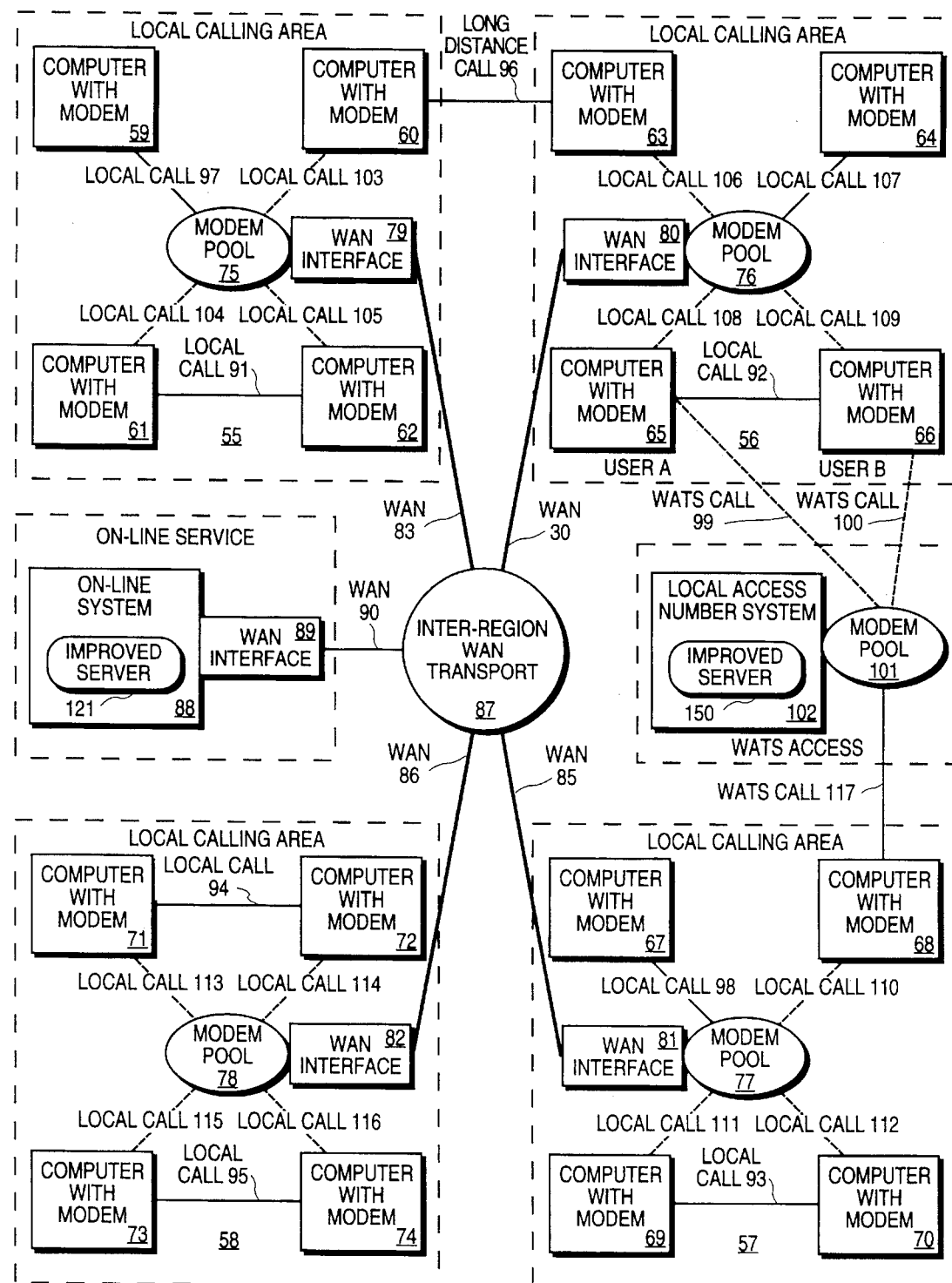
FIG. 2 illustrates the improved consumer on-line service network architecture to support multiple twitch game players as used in the preferred embodiment of the present invention.

By comparison of FIG. 2 and FIG. 1 it can be clearly seen that the infrastructure of the two architectures is substantially the same: both make use of local-access modem pools (21–24 and 75–78) tied in through a WAN (33 and 87) to a central server (34 and 88). Both network architectures also have a WATS-access modem pool (53 and 101) for initial user dial-up (51, 52 and 99, 100) to download local-access numbers from a dedicated local-access number server (54 and 102). In fact, the architecture specified by FIG. 2 is a full superset of that illustrated by FIG. 1. As such, conventional on-line service activities are accomplished in the FIG. 2 architecture utilizing the exact mechanisms discussed above for FIG. 1. For example, computer with modem 59 is logged into server 88, connected through local call 97, modem pool 75, WAN interface 79, WAN connection line 83, WAN 87, WAN connection line 90, and WAN interface 89, just as it would have been in the prior an FIG. 1 network architecture.

The FIG. 2 network architecture diverges from the FIG. 1 network architecture in an improvement of the client application software in computers (59–74), supported by an on-line system 88 running a improved server 150 (collectively referred hereinafter as server 88) to establish direct telephone connections (91–96) between computers (59–74) where appropriate. These direct telephone connections, once established, provide connections with low-latency, predictable latency, reasonable privacy, and (in the case of local calls) extremely low connect-time cost. These characteristics make the improved network architecture of FIG. 2 extremely suitable for 2-player twitch games, both technically and economically.

The operation of the improved network architecture of FIG. 2 can be shown by example by describing a pair of users as they log onto the on-line service and connect to each other to play a twitch 2-player video game. For the purposes of this example, User A is using computer with modem 65 of FIG. 2. User B is using computer with modem 66 of FIG. 2. Both computers (65, 66) are running client application software improved to support the capabilities described in the preceding paragraph.

1. User A specifies to the client application software running on computer with modem 65 the country code, area code, and telephone number required to reach the modem of computer 65. Similarly, User B specifies to the client application software running on computer 66 the country code, area code, and telephone number required to reach the modem of computer 66. If this information had been entered previously, for each computer (65 or 66), it need only be changed if the phone number changes (e.g. if the computer is connected to a different phone line).

The telephone network itself can be viewed as a low-latency, point-to-point (i.e. circuit-switched) WAN with each telephone number being the unique address of a "node" on the network. Particularly in regard to residential phone numbers, which rarely are part of a multi-line phone switch, a complete phone number (country code, area code, and number) refers to a unique site in the telephone network, and as such can be very accurately termed an "address" or "network address" in data network parlance. Note that in many parts of the world ISDN, which is a virtual switched-circuit data network, is available and provides the capability of a low-latency circuit-switched WAN. The telephone network, utilized with modems at each end of a telephone call (such as is the case in the presently preferred embodiment), provides much of the same data network capability as ISDN, albeit at a lower data rate with less reliability. And as such, data network terminology is used herein, even when referring to the telephone network.

2. (a) If the phone number specified by User A is different than the number used the previous time the on-line service running on server 88 was called by computer 65 (or the on-line service is being called for the first time). the client application software in computer 65 initiates a WATS call 99 to the modem pool 101 and logs into the local access number server 102. This step is illustrated in detail in FIG. 4 where computer 132 and modem 134 initiate a call 142 to modem pool 140 and log on to local access number system 139 with improved server 151. The area code and phone number entered by User A is transferred to the local access number server 102. By using the area code and phone number to index into a database, a local phone number corresponding to the nearest modem pool 76 is found and transferred back to computer 65. (If there is no access number within User A's local calling area 56 available, the phone number of the closest long-distance modem pool is transferred back to computer 65 and the client application software in computer 65 conveys a warning message to User A before proceeding.) Computer 65 may then disconnect from server 102 and terminate WATS call 99.

(b) If the phone number specified by User B is different than the number used the previous time the on-line service running on server 88 was called by computer 66 (or the on-line service is being called for the first time), the client application software running in computer 66 follows the same procedure as that specified in paragraph 2(*a*) above, except that computer 66 makes WATS call 100 to modem pool 101. Upon receipt of the phone number to the nearest modem pool, computer 66 disconnects from server 102 and terminates WATS call 100.

3. (a) The client application software running in computer 65 makes a local call 108 to local modem pool 76 and, by utilizing the conventional on-line service communication methodology described previously herein, logs onto on-line system 88 with server 121. This step is illustrated in detail in FIG. 5 where computer 132 and modem 134 initiates local call 144 to local modem pool 129 and logs on to on-line system 123 with server 122. User A specifies to server 121 the desire to play a particular twitch 2-player video game (or it is implicit in the use of particular client application software). This request is transferred from computer 65 to server 88. Also, the client application software in computer 65 transfers to server 88 the area code and phone number from which it is calling.

(b) The client application software running in computer 66 performs the same functions described above in paragraph 3(a), except that computer 66 makes local call 109 to reach modem pool 76.

4. Based on the country code, area code, and telephone number, the server 88 determines which currently logged-in users desiring to play twitch 2-player video games are located in the same local calling area. The server 88 determines in the case of User A and User B that they are both in local calling area 56. Then, the server 88 considers other factors such as which of these users from the same local calling area are interested in (and have computers capable of) playing the same game. Other considerations such as whether users are well-matched (e.g. based on prior play history), whether one user has a preference to play a particular other user, etc. are made by server 88, but in any case server 88 comes to a conclusion about which pairs of currently logged-in users are to be matched up to play each other as opponents in a twitch video game. For the sake of this example, we assume that server 88 concludes that User A and User B will be matched up as opponents.

5. Server 88 sends a message to the client application software running on computers 65 and 66 indicating that they are to be matched up. Relevant information is transmitted to each computer 65 and 66 regarding the opposing user such as the user's "handle" (i.e. the alias or "screen name" used by user on the on-line service), statistics about the user's prior performance, etc. Also, an identification code, unique to this specific match-up, is sent to both computers 65 and 66.

6. Finally, the server 88 makes a decision about which computer with modem is to initiate a call to the other computer with modem. There are a number of factors regarding game play convenience and cost that could make it preferable for one computer with modem to initiate the call rather than the other. For example, Call Waiting, a residential telephone service that allows an active call to be interrupted if a new call comes in, will disrupt a modem connection. If one of the telephone numbers of the computers with modem 65 and 66 has a Call Waiting feature and the other does not, it is preferable for the computer with the Call Waiting feature to initiate the call; because, on an outgoing call, Call Waiting usually can be deactivated (e.g. in the 415 area code the dialing sequence *70 deactivates Call Waiting). However, on an incoming call, Call Waiting usually cannot be deactivated. As another example, if one telephone line has metered local telephone service with a charge per call and the other has flat-rate local telephone service, then clearly the telephone line with flat rate local telephone service should initiate the call. Of course, there will be situations where it doesn't matter which computer with modem initiates the call. In this case, the decision will be random or based on an effort to balance the number of initiated and answered calls to each computer with modem over time. For the sake of this example, we assume that server 88 determines that computer 65 initiates a direct local call to computer 66.

7. a) Server 88 transfers the telephone number of computer 66 to the client application software running on computer 65. Notably, this phone number is kept internally within computer 65. It is not displayed nor made accessible to User A. This is an important privacy consideration. The client application software running on computer 65 directs its modem to hang up the telephone line thereby disconnecting local call 108. Immediately following disconnection of local call 108 (or with a brief delay to allow synchronization), computer 65 dials the local telephone number of computer 66 as received from server 88.

b) Server 88 transfers a message to the client application software of computer 66 indicating that it is to expect a telephone call from the opposing user's computer. The client application software of computer 66 directs its modem to hang up the telephone line thereby disconnecting local call 109 and waits for its telephone line to ring.

8. The telephone line of computer 66 rings, and its modem notifies the client application software of computer 66 of the event. The client application software of computer 66 directs its modem to answer the phone line, (on the first ring since it knows a call is due immediately), thereby establishing the direct phone connection 92 between computer 65 and computer 66. This direct phone connection is also illustrated as local call 146 illustrated in FIG. 6. The client application software on each computer 65 and 66 sends to the other computer the identification code it had been transferred from server 88 in Step 5 described above. Each computer verifies that the identification code received from the other computer is the same.

9. Using whatever methods are appropriate for the particular twitch two-player game being played by User A and User B, the computers 65 and 66 synchronize with each other, and User A and User B play their twitch two-player video game. Eventually, one user wins, or the game otherwise comes to an end.

10. The client application software on computers 65 and 66 direct their respective modems to hang up the telephone line, thereby disconnecting local call 92.

Figure 7:
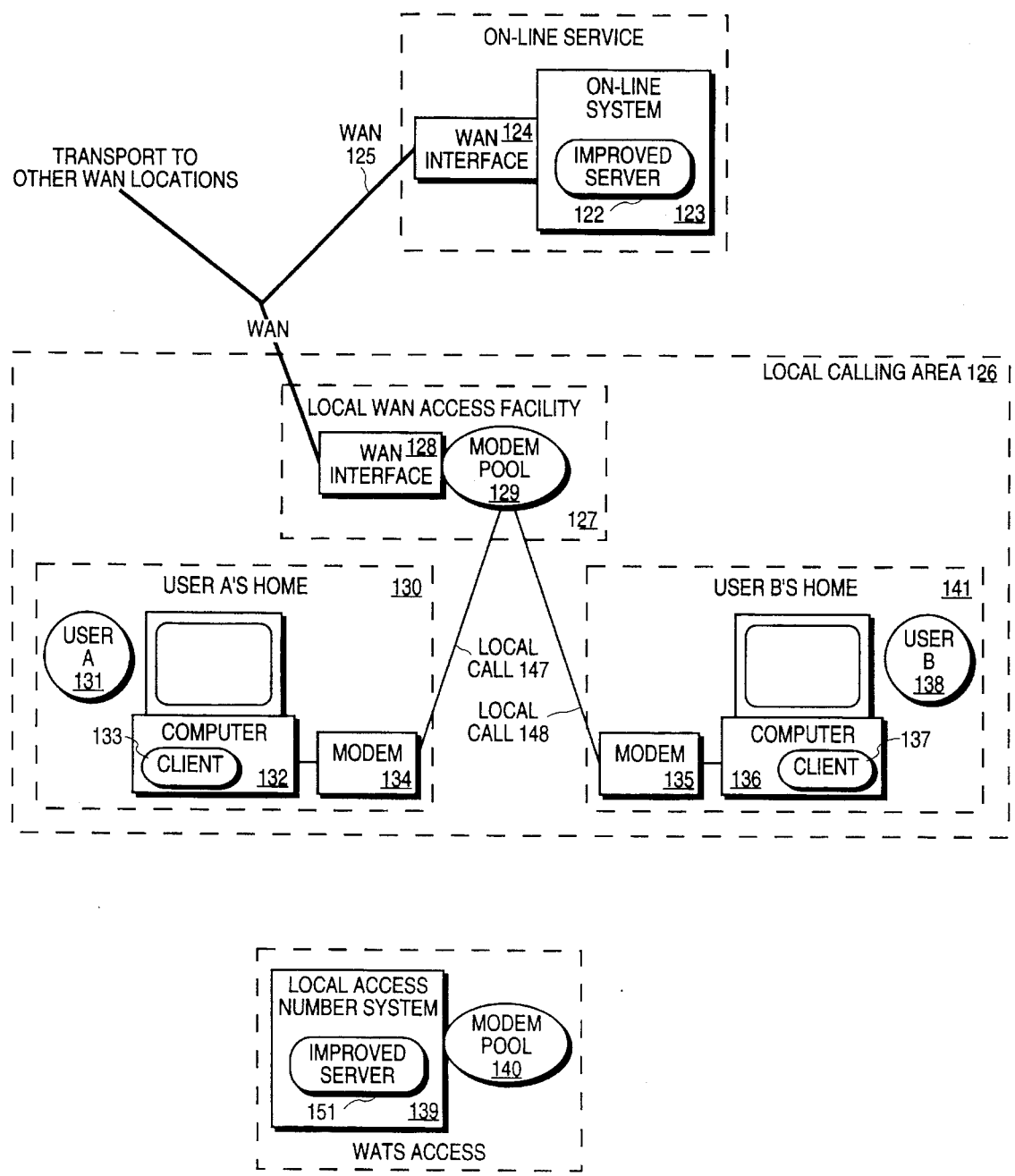
FIG. 7 illustrates a pair of players dialing into an on-line service to report game play results.

11. If it is necessary or desirable to report the outcome or statistics of the game to server 88, the client application software of at least one of the computers 65 or 66 dials back into the modem pool 76 and logs back into server 88. This step is illustrated in detail in FIG. 7 where computer 132 with modem 134 calls local modem pool 129 and logs on to on-line system 123 with improved server 122. At this point the outcome or statistics of the game are transferred to the server 88. If they so desire, User A or User B may activate another twitch two-player game, returning to step 3 above (if they have not already logged back into server 88) or step 4 above (if they have already logged back into server 88).

The improved network structure and process of the present invention as described above provides several advantages and advances over the prior art. The advantages are described below.

Economics

Although the example of the present invention described above listed 11 steps, almost all of the time is normally spent during step 9, when the actual game is being played. This is significant because the on-line service provided by server 88 incurs a connect-time cost while a user is logged into modem pool 76 and utilizing WAN 87. There is no cost or minimal cost to the user or the on-line service during direct local phone call 92, which is the only communications in progress during step 9 as described above.

Latency

Because the connection made between the two modems during step 8 is a direct telephone connection (and there are only two modems between the two computers 65 and 66), the latency for transferring data between computers 65 and 66 is minimal (for local calls, much less than 100 msec, and highly consistent), and quite adequate for twitch two-player video games.

Privacy

Although the phone number of User B is transferred to the computer of User A during step 7, the phone number of User B is not made available to User A. Certainly, it is possible for User A to attach a touch tone decoder device to the phone line while User B's number is being dialed (or use software tools to break into the client application software directly) to maliciously capture User B's phone number, but barring such deliberate (and technologically sophisticated) action, User B's phone number will not be revealed to User A. This provides a modicum of privacy to User B.

Further, if User A is in a calling area where Caller ID service is provided, the correct touch-tone sequence to disable the call identification will be generated by the client application software in User A's computer prior to initiating a call. This provides complete privacy to User A.

In the presently preferred embodiment, a user can also indicate to the client application software that complete privacy of their phone number is required. This information is then transferred to the on-line service which limits the user's two-player game match-ups to ones in which the user desiring privacy is originating the call. If the user is in an area where Caller ID service is provided, the correct touch-tone sequence to disable call identification will be generated by the client application software prior to initiating a call. If two users requiring complete privacy desire to play each other, each user is notified by the on-line service of the privacy deadlock, and each is given an opportunity to lift the incoming call restriction for this particular match. If at least one agrees, the match commences. If not, they are notified that the match-up is not possible.

Given the modicum of privacy provided at a minimum to all users, and the opportunity for users who require it to establish complete privacy and only lose connectability to other completely private users—and even then have an opportunity to reach them on a call-by-call basis, the improved network architecture of FIG. 2 provides an adequate level of privacy for consumer video game applications.

Wrong Number

In Step 1 above, it is possible that User B incorrectly enters the telephone number attached to the computer with modem 66 being used. If User B enters the number at least partially correctly, it is possible that in step 2(b) the Local Access Number System 102 will provide a reasonable telephone number (e.g. one with a local area code) to a modem pool, and User B's computer 66 will then successfully log on to the server 88 despite the erroneous telephone number that had been entered in Step 1.

Continuing through above-described steps 3 through 6, with an incorrect telephone number, in step 7(a), the server 88 will transfer the incorrect telephone number that had been entered by User B to User A's client application software running on computer 65. This will cause the client application software to direct computer 65 to dial a wrong number.

After the wrong number has been dialed, there are several possible call progress events that will occur. With current modem technology, such call progress events can be detected by computer 65 and the information made available to the client application software. Given the following possible events, the client application software responds as described below. (Note that certain of these events may be the result of an interruption to the answering telephone line such as a person picking up an extension telephone, etc. These situations are addressed below in the section labeled Call Interruptions.)

a. The call progress ring sound rings more than once. The client application software of computer with modem 66 knows to answer on the first ring (see Step 8). If computer 66 does not answer on the first ring, something is wrong. (Some calling areas may have more than one call progress ring sounds transmitted to the originating telephone for each ring signal transmitted to the answering telephone. For such areas the expected number of call progress ring sounds are increased accordingly.) The client application software detects that there are too many call profess rings and immediately hangs up the telephone.

b. There are call progress tones that indicate there is a problem with the number dialed (e.g. such as those preceding a message such as "We're sorry, but the number you have dialed is not in service at this time."). The client application software detects these call progress tones and immediately hangs up the telephone.

c. There is a call progress busy signal. The client application software detects these call progress tones and immediately hangs up the telephone.

d. A person answers the telephone after the first ring. The client application software detects that the telephone has been answered and if there is no modem answer tone within a short period of time (e.g. under 5 seconds), it hangs up the telephone.

With older or less sophisticated modems, some or all of the above mentioned call progress events cannot be detected. In this case, the client application software waits a reasonable amount of time (this amount of time, will vary with calling area) for a modem answer tone after which it will hang up the telephone.

There is also the possibility that by calling the wrong number, computer 65 will happen to reach a compatible modem that answers on the first ring. As soon as the modems synchronize and connect, the client application software running in computer 65 will expect to receive the identification code it had been transferred by server 88 in Step 5.

Assuming a reasonable number of bits and a decent randomizer is used, it is virtually impossible that the wrongly-called modem will happen to transmit this particular identification code. When the client application software fails to receive the identification code within a reasonable period of time (e.g. under 5 seconds), it will hang up the telephone.

Any of the above cases will cause the client application software running in computer 65 to determine that it has not successfully reached computer 66. Depending on the circumstances, it might be worthwhile for the client application software to attempt to call again (e.g. if the phone was busy), but if not, it will notify User A that the connection attempt to User B was unsuccessful. Computer 65 will again dial into modem pool 76, log into server 88 using the methods previously described, and report that it was unable to reach computer 66. Server 88 makes a record internally of the problem. If there has been a history of calling problems for computer 65, server 88 transmits a message to computer 65 to notify User A to call a customer service number and get technical assistance. If there is no history of calling problems, returning to Step 4 above, User A will be matched up with a different currently logged-in user.

If User A is thus unsuccessful in reaching User B, the client application software running in computer 66, after a reasonable amount of time (e.g. 2 minutes) will give up waiting for computer 65 to call. It will notify User B that the connection attempt to User A was unsuccessful, and computer 66 will again dial into modem pool 76, log into server 88 using the methods previously described, and report that it was unable to reach computer with modem 65. Server 88 applies heuristics to the report submitted by the client software of computer 65 combined with previous reports on the connection history of computer 66 and attempts to diagnose the problem. The diagnosis will be based on the past history of connection attempts to computer 66 (e.g. if there has never been a successful connection, a wrong number was probably specified in Step 1). If the heuristics lead to a likely cause of the connection problem, server 88 will transmit a message to computer 66 to notify User B of the likely cause. If the heuristics lead to an indeterminate cause, server 88 will transmit a message to computer 66 to notify User B to call a customer service number and get technical assistance.

Call Interruptions

Even if computer 65 correctly dials computer 66, there are a number of possible call interruptions that must be addressed.

a. Extension telephone answer. The telephone will ring once at User B's location before computer 66 answers the telephone. It is possible that another person at the location will answer an extension phone. If this occurs, this person will hear unpleasant modem modulation sounds, probably realize that it is data call, and hang up the phone. Such a brief disruption should not interfere with initial modem synchronization. If the person does not hang up the telephone, it would have the same implications as the extension pick up case addressed in the next paragraph.

b. Extension telephone pick up. At either User A's or User B's location, a person may pick up an extension telephone to make a call during modem communications. If this occurs there may be a corruption or disruption of data traffic, or at worst, such a severe loss of signal integrity between the modems that one or both modems hang up. If one or both modems hang up, it would have the same implications as the disconnected telephone call case addressed below. But if there is only a corruption or disruption of data traffic, it is the responsibility of the twitch two-player video game software to recognize the problem (typically using error correction methodology in the data communication protocol), and compensate for it (e.g. by halting the game and resynchronizing once the person has hung up the phone and the data integrity has returned).

c. Call Waiting interruption. If User B's telephone line is equipped with the Call Waiting feature and a call comes in, it will cause a disruption in the modem communications. This issue is addressed in the same manner as the Extension telephone pick up case described above.

d. Disconnected telephone call. If the telephone call is disconnected for any reason (including a malicious disconnection by a user who is losing the video game being played), both computers 65 and 66 call back into modem pool 76 and using methods previously described will log into server 88. The client application software of each computer 65 and 66 transmit a report of the disconnection. If it is possible to determine the cause of the disconnection (e.g. if one of the modems is capable of detecting loss of line current, it can determine that its phone line was physically disconnected), server 88 will send a message back to both User A and B as to who was to blame for the disconnection. If there is a history of either User A or User B regularly being disconnected from an opponent (particularly while losing), that user will be referred to a customer service number to identify the problem (or to be issued a warning if it is likely the user is disconnecting maliciously). If there is no history of either User A or User B regularly disconnecting from an opponent, the incident will be logged by server 88, and resuming with Steps 7(a) and 7(b) described above, User A and B will try to be connected again. Depending on the game and the circumstances, server 88 may or may not consider the partial score results of the interrupted game for purposes discussed in Step 11 described above.

e. Outside voice call to User B's telephone between Step 7(b) and step 8. If a person happens to call User B's telephone after computer 66 has hung up from modem pool 76 and before computer 65 has called, computer 66 will answer the phone, anticipating the call from computer 65, and will generate a modem answer tone. The calling party probably will hang up the phone after hearing the tone, but even if they don't, computer 66 will hang up within a reasonable amount of time (as defined in the modem protocol) if it does not hear an originating modem tone in reply. The client application software will then wait to answer the next call, and if the call is from computer 65, everything will continue normally. If the call is not from computer 65 (e.g. the same unfortunate person called back again, only to get a modem answer tone again), the client application software will hang up the phone, call back into modem pool 76 using methods previously described and report the situation to server 88. Server 88 will use heuristics to consider the history of call answering problems with computer 66 as well as a possible call originating problem report from computer 65. Based on these heuristics either the connection between User A and User B will be re-attempted, starting with Step 7(a) and Step 7(b), or User A, User B or both will be referred to a customer service number for technical assistance.

f. Outside modem call to User B's telephone between Step 7(b) and Step 8. If a modem happens to call User B's telephone after computer 66 has hung up from modem pool 76 and before computer 65 has called, computer 66 will answer the phone, anticipating computer 65, and will generate a modem answer tone. If the calling modem is not compatible with the answer tone, it will hang up, or in any case the computer 66 will hang up within a reasonable amount of time (as defined in the modem protocol) if it does not hear an originating modem tone in reply. If the calling modem is compatible with the answer tone, the two modems will synchronize and connect, and the client application software running in computer 66 will expect to receive the identification code it had been transferred by server 88 in Step 5. It is virtually impossible that the wrongly-calling modem will happen to transmit this particular identification code if the code is of reasonable complexity. When the client application software fails to receive the identification code within a reasonable period of time (e.g. under 5 seconds), it will hang up the telephone, and treat the situation exactly the same as the outside voice call case described above.

Elimination of the Identification Code

In Step 5 above, a unique identification code is sent to both computers 65 and 66. Such a code is desirable for the sake of reducing the likelihood of an erroneous modem connection, but it is not necessary for the essential functionality of the Improved Network of FIG. 2. The likelihood of the computers 65 and 66 dialing (or answering) a call during the connection process that results in an erroneous connection to another modem is small, so the potential benefit of the identification code is limited.

No Match is Available

In Step 4 above, the server matches up players who are currently logged in based on criteria such as those discussed above. Sometimes, it may be the case that when a user logs in there is no available player who meets the matching criteria. There are several options to handle this situation:

a. The server notifies the user (via the client application software) that there are no suitable matches available and asks the user to either remain on-line (which would be expensive) or logout and try again later.

b. The server notifies the user that there are no suitable matches available, but suggests that the matching criteria be broadened (e.g to allow a game with a player of a different skill level) to permit connection with another user who is available.

c. The server notifies the user (the "first user") that there are no suitable matches presently available, but that when one (the "second user") becomes available, the first user will be called by the second user. Then the first user's computer will logout from the server and hang up from the modem pool and wait for the call. When a second user (i.e. a suitable match for the first user) logs into the server, the server will transfer the first user's telephone number to the second user's computer. The second user's computer will log out and call the first user. From this point onward, the computers of the two users will follow normally from Step 8, above.

d. Follow the procedure described in c above, with the modification that the first user's computer and the server will time out after a specified interval. In this way, if there is no match available for a long time, the first user's computer won't continue to answer the telephone, and the server won't direct a telephone call to the first user's telephone line long after the first user has given up waiting.

Automatic Number Identification

Most of the operation of the Improved Network of FIG. 2 as described in Steps 1–11, above occurs without user intervention. However, the very first procedures of Step 1 require the users to specify the telephone numbers of their computers. Such an operation is fraught with potential errors. Some examples:

a. the user may make an entry error while entering the number.

b. the user may take the computer with modem to a friend's house and not remember (or realize it is necessary to) enter a new number.

c. the user may take the computer with modem to a friend's house and not realize that the friend's house is in a different area code.

d. the user may maliciously enter a wrong number in order to "trick" another computer with modem on the network to call the wrong number to annoy the person who answers.

In order to reduce the likelihood of such telephone number entry errors, it would be desirable for the user telephone number entry procedure of Step 1, above to be entirely automatic. And, when this is not possible, it would be desirable to attempt to verify the correctness of the entered user telephone number.

In many areas of the United States, it is possible to determine a calling telephone number from the telephone network. Telephone network services such as Caller ID and Automatic Number Identification can provide a caller's telephone number to a suitably equipped telephone answering device, and then the telephone number can be transferred to a server coupled to the answering device. Thus, in the Improved Network of FIG. 2, in Step 1, above, if User A was in a calling area that provided Caller ID or Automatic Number Identification services, rather than User A entering the telephone number of the telephone line connected to computer with modem 65, a suitably equipped answering device in modem pool 101 would determine User A's computer with modem 65 telephone number and would provide it to server 102. The server 102 would then transfer this telephone number to the client application software of computer with modem 65. Then, in Step 3, above, when the client application software transfers the telephone number to server 88, the telephone number transferred would be correct with a higher degree of certainty than if the User A had entered the telephone number manually.

In many calling areas, however, Caller ID and Automatic Number Identification are not available either for technical or legislative reasons. In such areas it may be possible to verify a user's area code, and possibly the calling area (e.g. city), but in some cases no identification at all is possible. Without a direct method to identify or verify a user's telephone number, indirect methods can be used:

a. Step 1 and 2, above are followed as described with User A entering the telephone number of computer with modem 65 and computer with modem 65 transferring the telephone number to server 102. Server 102 would then transfer the telephone number of modem pool 76 to computer with modem 65, and computer with modem 65 would logout and hang up. Then, prior to Step 3, the computer with modem 65 would await an incoming telephone call for a specified period of time. A modem with outgoing calling capability attached to server 102 would call the number given to server 102 by computer with modem 65. If computer with modem 65 answered and identified itself correctly, then the telephone number would be verified and all would proceed normally with Step 3. If computer with modem 65 was not called by the specified period of time, then the number would be assumed incorrect. User A would be asked to enter a corrected number, and with this new number computer with modem 65 would again follow Steps 1 and 2, and then attempt a second verification.

b. A simple, albeit imprecise verification, is for computer with modem 65 to attempt calling the telephone number entered by User A. Clearly, such a call should result in a busy signal. If it doesn't, the number is not correct. The area code can be verified in many areas by dialing 1—(entered area code)-555-1212. If the call is answered with error call progress tones and "We're sorry the number you're calling cannot be completed as dialed." then the entered area code is likely correct. If it is answered by a directory assistance operator, then the number is not correct (of course a danger with this approach is that an incorrect area code will result in a long distance directory assistance charge on the telephone bill).

Even if the user's telephone number is identified or verified to be correct (or probably correct) by the methods just described, it is still possible for the user to move the computer with modem 65 to another telephone line after Steps 1 and 2 have been completed. The ideal solution for this problem is to equip all modem pools (75–78) that connect to server 88 so as to support Caller ID and to transfer the calling telephone number determined from incoming calls to server 88. In this way, at least in areas that provide Caller ID, user telephone numbers can be verified at the time of connection to the Improved Network. Unfortunately, such an equipment upgrade would be an enormous capital investment to the existing infrastructure of public data access network modems.

In addition, for areas that do not provide Caller ID services, the best verification possible at the time of connection to the network would be for a computer with modem to call its own number and make sure there is a busy signal. This hopefully will catch many of the simple cases where, for example, a child brings a computer with modem over to a friend's house and does not realize that a new telephone number must be entered.

Also, it is possible to determine that the line current on a telephone line has dropped. If a user's modem is capable of determining this condition (even if the power is disconnected) then it can signal the client application software running in the user's computer to remind the user to make sure the telephone number has not changed. This may help determine the case where the user moves the computer with modem to a different telephone line.

Overlapping Calling Areas

The illustrations of FIGS. 1, 2, 4, 5, 6, and 7 all show computers with modems that are in the same local calling area sharing a single modem pool for that calling area. Such illustrations are a simplification of the actual situation for the sake of clarity. It is in fact the case that local calling areas (i.e. areas in which flat-rate residential calling applies without additional toll charges) often overlap, such that while a first user and a second user may be able to call each other as a local call, a third user may be so located that the first user may call the third user as a local call, but the second user cannot.

For example, a first user in Mountain View, Calif. can call a second user in Sunnyvale, Calif. as a local call, and the first user can call a third user in Woodside, Calif. as a local call. But if the second user calls the third user, it is not a local call since Woodside is beyond Sunnyvale's local calling area, but not beyond Mountain View's.

Thus, it is quite possible that a given two users who are in each other's local calling areas happen to connect to the network server through two different modem pools. Each modem pool might be in the local calling area of one of the users, but possibly not the other user, yet still the users may be matched as being able to call each other as a local call. It will be apparent to one of ordinary skill in the art that such a situation does not impact the methods or construction of the Improved Network described herein.

Multiple Simultaneous Sessions

The solid lines of FIG. 2 show an example of the connections in place during multiple simultaneous sessions. The dotted lines show connections that were in place previously or temporarily. Some computers (59, 64, 67) are connected to modem pools (75, 76, 77) and simultaneously logged into server 88. These computers (59, 64, 67) are either waiting to be matched up with other computers (as in Step 4 of the example described above) or are utilizing other non-real-time services of the system 88. Other computers (61 and 62, 65 and 66, 71 and 72, 73 and 74, 69 and 70) are directly connected using the present invention and in the midst of playing twitch two-player video games. Also, some users may indicate to the server 88 that they are willing to pay for long-distance telephone charges. Such users will then be able to be matched up with users in non-local calling areas. Note that any user, whether enabling out-going long-distance calling or not, is able to accept a long-distance call without incurring long-distance charges. For example, computer 60 is shown connected to computer 63 through a long-distance connection 96. Although one of them has indicated to server 88 that long-distance calls are permitted, the other may have authorized only local calls.

Clearly, FIG. 2 shows a tiny fraction of the number of simultaneous users in a typical network. For example, the twitch two player video game "MORTAL KOMBAT™" from "ACCLAIM™", Inc. sold millions of copies. If only a fraction of the owners of this video game were to use a version of it in a video game system (i.e. video game computer) equipped with a modem and client application software such as that described herein, there would be thousands of users in each major metropolitan area in the United States. If only a fraction of these users were inclined to play "MORTAL KOMBAT™" remotely with another player at a given time during the day, each local calling area in each major metropolitan area would have many available players during almost any time during the day.

The possibility of so many simultaneous players certainly suggests that there is a large pool of possible opponents for top video games (at least in major metropolitan areas); but, it also suggests that there could be heavy demands on server 88, modem pools (such as 75–78) and WAN 87. In the network architecture illustrated in FIG. 1, such a large simultaneous load would be very difficult to manage. But in the improved network architecture of FIG. 2, such a load is not nearly as difficult; because, the bulk of any user's connect time is occupied in a direct telephone connection with another user. In the improved network architecture of FIG. 2, the on-line service connect time per user (and thus the average load on modem pools (such as 75–78), WAN 87, and server 88) is a fraction of that of a similar number of simultaneous users in the network architecture of FIG. 1.

Thus, the improved network architecture of FIG. 2 provides adequate communications latency to support twitch two-player games and handles a large number of simultaneous users at far lower cost than the conventional network architecture of FIG. 1.

Figure 3:
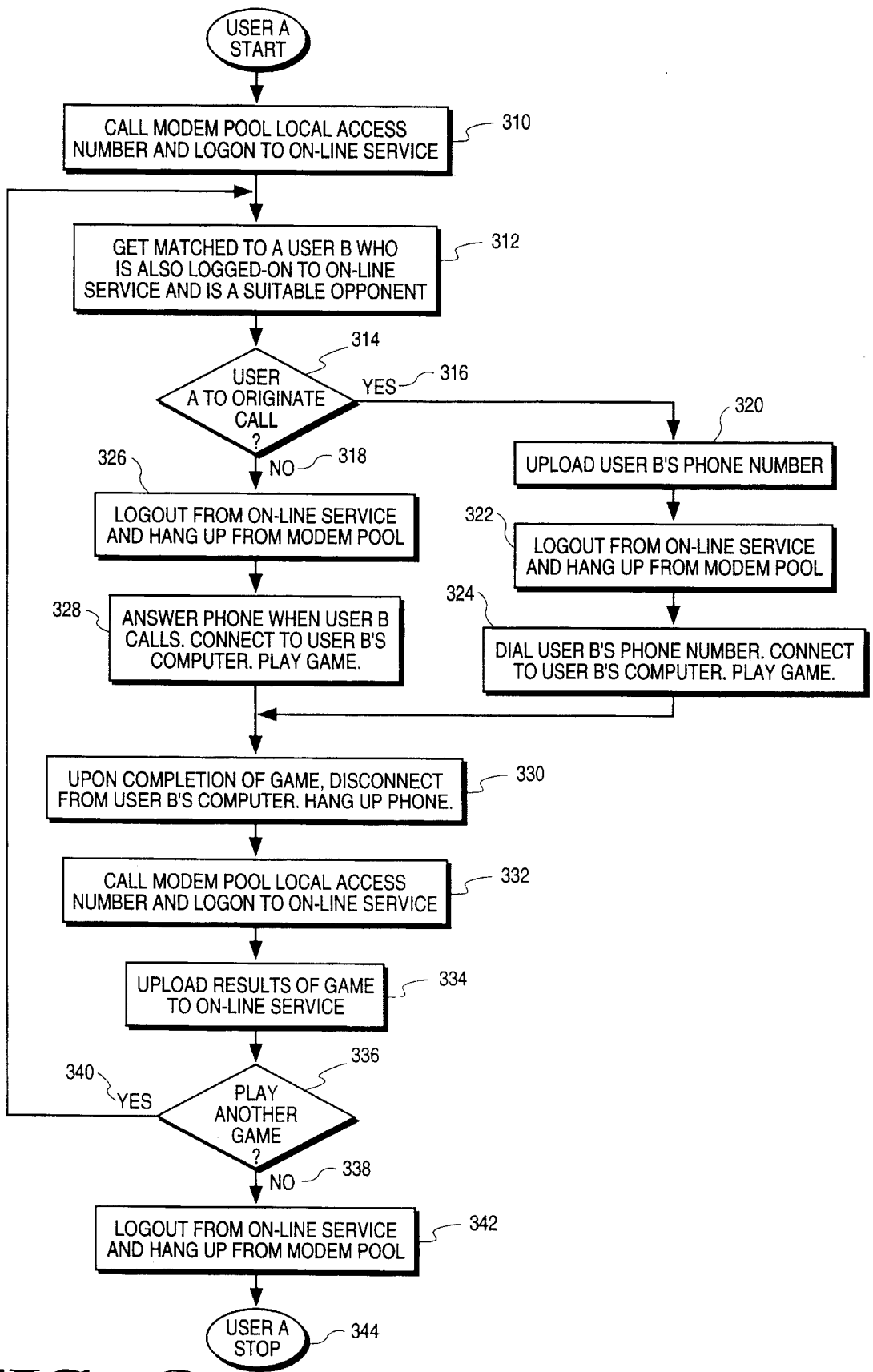
FIG. 3 is a flow chart illustrating a user interaction with the improved network of the present invention.
Figure 4:
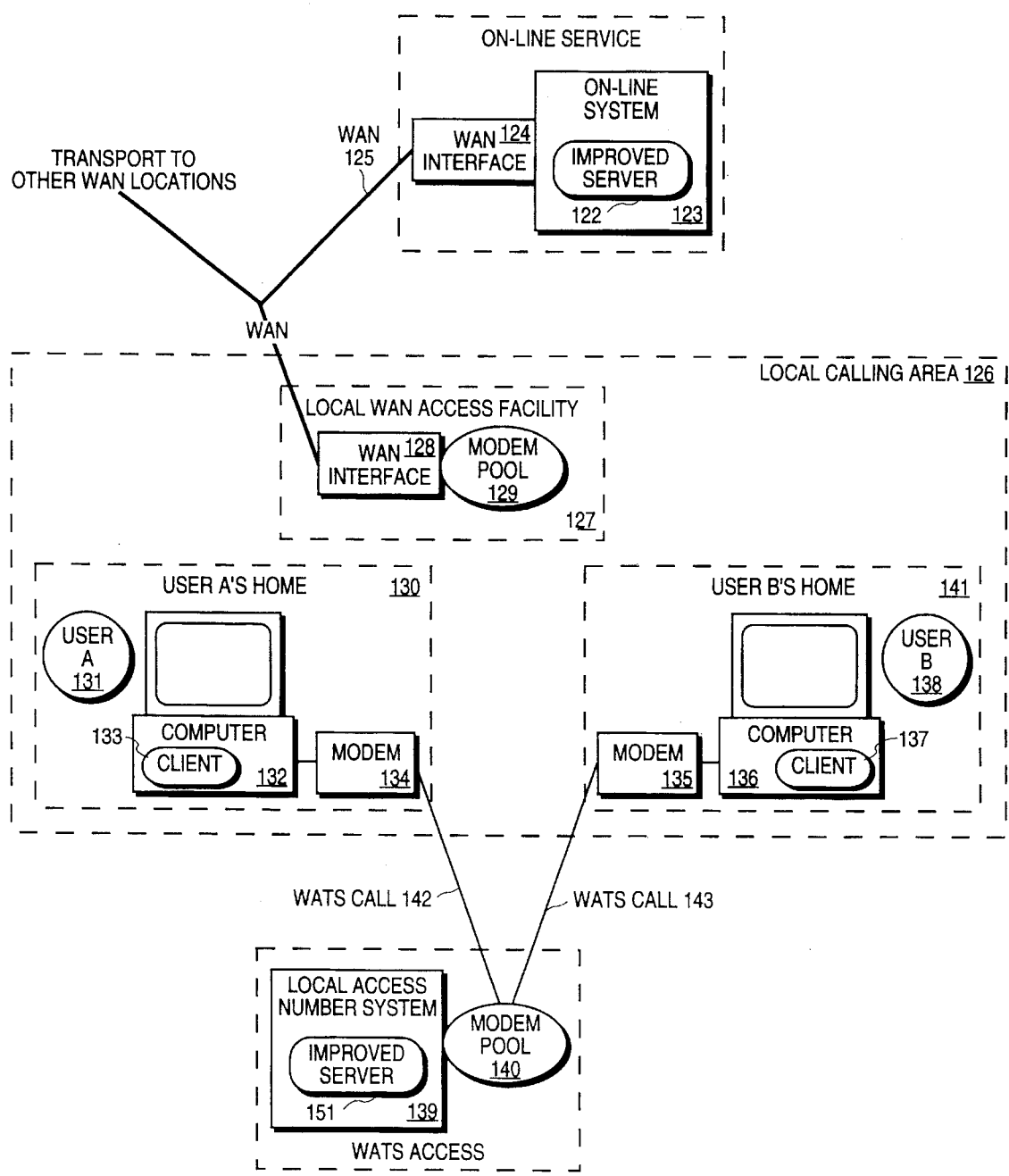
FIG. 4 illustrates an example of two players obtaining the local access number of a Local WAN Access Facility.

Referring now to FIG. 3, a flow chart illustrates the processing performed during a user's interaction with the improved system of the present invention. The flow chart indicates the steps taken by a single given user from that user's perspective. At processing block 310, a first user places a call to a modem pool local access number and logs on to an on-line service. Referring to FIG. 4, the operation of obtaining a local access number is illustrated. A first user 131 has a computer 132 running client software 133. A modem 134 is coupled to computer 132. Using well known techniques, computer 132 in combination with modem 134 places a call 142 to modem pool 140. Computer 132 then logs on to local access number system 139. A local phone number to the nearest modem pool 129 is found by improved server 151 and transferred back to computer 132. In a similar manner, a second user 138 with computer 136 accesses modem pool 140 by placing a call 143. In this manner, second user 138 obtains the local phone number to modem pool 129.

Figure 5:
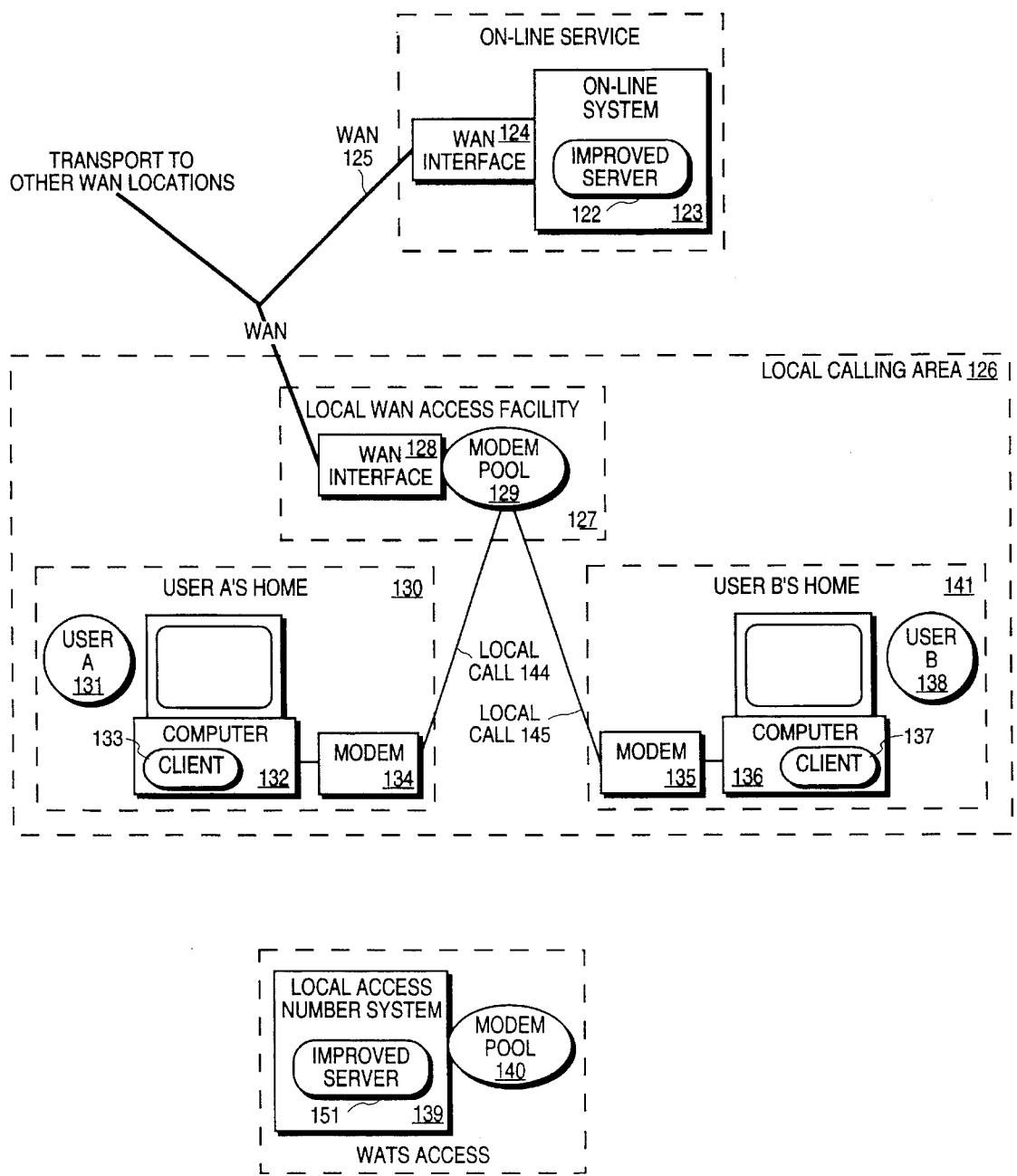
FIG. 5 illustrates an example of a first player obtaining the phone number of a second player.

Referring now to FIG. 5, the first user uses computer 132 and modem 134 to place a local call to modem pool 129 using the local modem pool telephone number obtained as described above. Second user 138 with computer 136 may also place local call 145 to modem pool 129. First user 131 uses a modem from modem pool 129 to access on-line system 123 through wide area network (WAN) interface 128 and 124. On-line system 123 includes an improved server 122 as part of the present invention. First user 131 specifies the desire to play a particular multiple player twitch game to on-line system 123 and improved server 122. This request is issued by client software 133 in computer 132. Client software 133 also informs improved server 122 of the area code and telephone number from which first user 131 is calling. In a similar manner, second user 138 calls on-line system 123 through modem pool 129, wide area network interface 128 and 124. Client software 137 within second user computer 136 also requests on-line system 123 and improved server 122 for matching second user 138 with another player for a particular twitch game. Based on the country code, area code, and telephone number, improved server 122 determines which currently logged in users have requested matching with other players for a particular twitch game located in the same local calling area. Other factors described above are also considered during the matching process performed by improved server 122. Improved server 122 thereby matches first user 131 with second user 138 for matched play in a particular twitch game. This step is illustrated at processing block 312 illustrated in FIG. 3.

Figure 6:
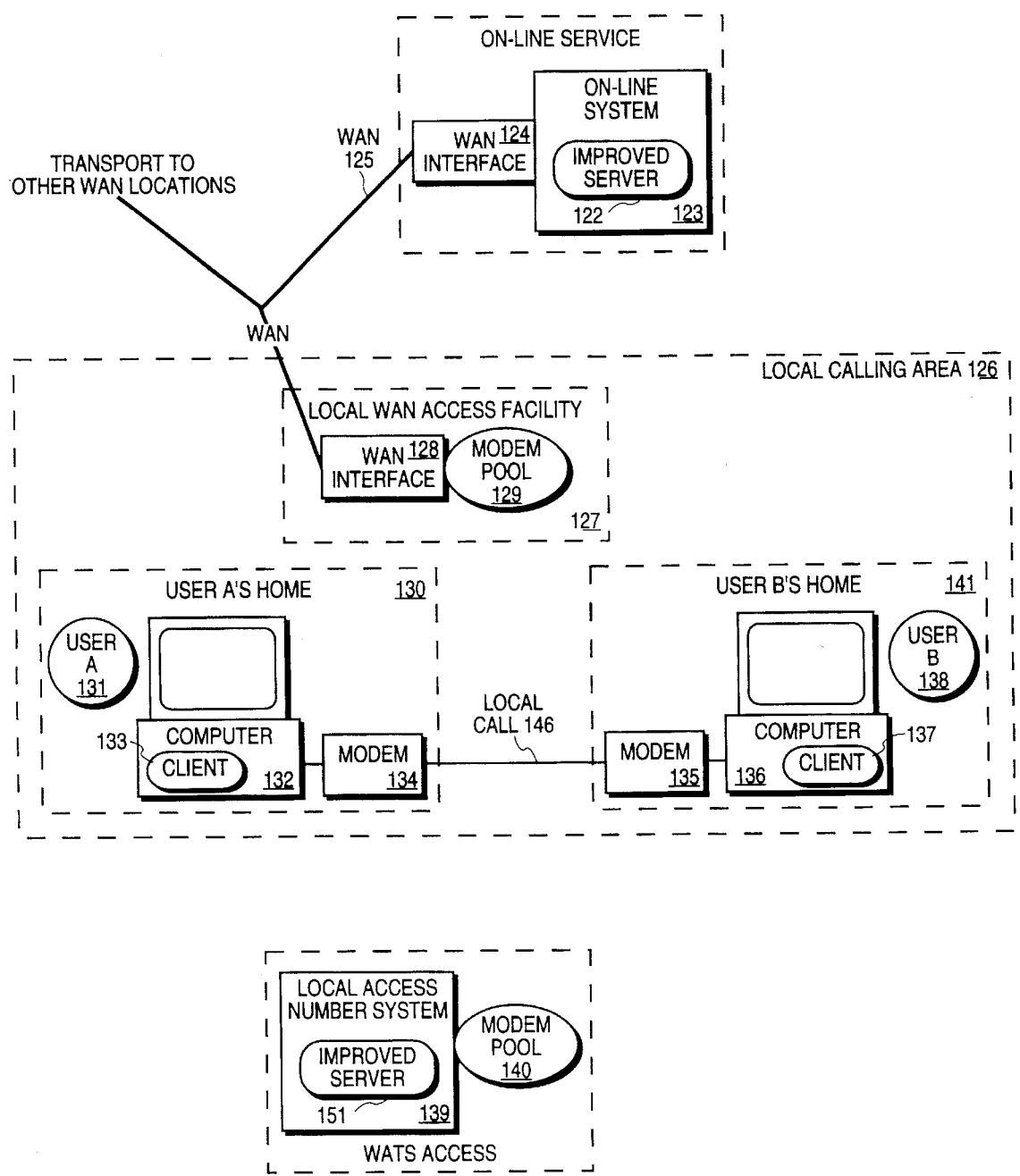
FIG. 6 illustrates the direct connection between two remote players of a twitch game.

Referring again to FIG. 5, as previously determined in a configuration set-up, or as dynamically determined based on some optimization criteria, either first user 131 or second user 138 is chosen by improved server 122 to be the originator of, and for the other user to be the answerer of, a direct telephone link between them. In FIG. 3, consider the case where first user 131 is chosen to originate the call. Processing path 316 is taken, and first user's 131 computer 132 obtains the direct telephone number of matched second user 138 from improved server 122 (processing block 320). First user's 131 computer 132 may then log out from on-line system 123 and terminate the telephone connection 144 with modem pool 129 (processing block 322). First user's 131 computer 132 and modem 134 then calls second user's 138 computer 136 and modem 135 and establishes a direct link (local call 146) between them as illustrated in FIG. 6. Matched player 131 may now play a twitch game with matched player 138 (processing step 324).

If second user 138 is specified to originate the direct telephone link with a matched player, processing path 318 is taken to processing block 326. In this case, first user's 131 computer 132 logs out from on-line system 123, and terminates local call 144 to modem pool 129. First user's 131 computer 132 then waits for second player 138 to directly call first player 131 (processing block 328), and modem 134 answers the phone when it rings. At this point, the direct local call 146 between first user 131 and second user 138 is established as illustrated in FIG. 6. Matched player 131 may now play a twitch game with matched player 138 (processing step 328).

Referring again to FIG. 3, play continues until completion of the game being played by user 131 and user 138. On completion of the game, each user terminates direct local call 146 by hanging up the telephone (processing block 330).

The statistical summary of results of the game played by user 131 and 138 is retained by both players. Upon completion of the game, the computer 132 of player 131, the computer 136 of player 138 or both may initiate a telephone data connection with on-line system 123 and improved server 122 for the purpose of transferring the game results to improved server 122. This process is illustrated in detail in FIG. 7. Computer 132 and modem 134 of first user 131 initiates local call 147 to modem pool 129. In a manner similar to that described above, first user 131 logs into on-line system 123 with improved server 122. This step is illustrated at processing block 332 illustrated in FIG. 3. In a similar manner, second user 138 using computer 136 and modem 135 may also initiate a local call 148 to modem pool 129 and log on to on-line system 123. The results of the game played between user 131 and 138 is transferred to improved server 122 for storage in a game player statistical database. This step is illustrated as processing block 334 illustrated in FIG. 3. The statistical database maintained within improved server 122 may be used for optimally matching players of approximately equal skill levels upon subsequent requests for matched play, or for other purposes. The present invention also has the advantage that either first player 131 or second player 138 may access improved server 122 for the purpose of updating the statistical record of the game played between first user 131 and second user 138. In this manner, a loser player may not thwart the recordation of game results.

Referring again to FIG. 3, either user 131 or 138 may then initiate playing another game using the same process described above. In this case, processing path 340 is taken to processing block 312 where each user is again matched with a suitable remote player using the same processing steps described above. If however either user does not desire to play another game, processing path 338 is taken to processing block 342 where either user logs out from on-line system 123 and terminates local call 147 or 148 to modem pool 129 (processing block 342). User access to the present invention then terminates at the bubble labeled 344.

Connection Pools

Although several solutions have been provided above to address privacy, wrong numbers, and call interruptions prior to or during twitch multiple-player matching and game data play, almost all of these issues would cease to be problems if we could simply arrange for each players' computers to originate the telephone call to connect the multiple-player game. In this scenario, neither player is waiting to be called, so there is no risk of a wrong number or an outside call arriving at the wrong moment. In addition, Call Waiting (in most areas) can be disabled while dialing out, and the phone number of each user is never transferred to another user.

The existing telephone network cannot provide a connection between two originating calls outside of a conferencing context; but, it is possible in the prior an to establish connection pools that take two telephone lines that have dialed in (and have identified themselves as needing to be matched-up) and connect them in a conference call (albeit a two-way conference call).

Although the connection pool and conferencing system is a desirable configuration from the point of view of convenience and privacy, it is considerably more expensive than having one user call the other user directly. Two telephone lines leading into the connection pool will be in use for the duration of each twitch two-player game, and unlike the telephone line in use by the user in the present invention, which is typically a residential telephone line, the connection pool telephone line must be business telephone lines. These lines are typically billed at a higher rate, and in some cases are billed by the amount of time that they are in use.

Still, the cost of the connection pool is far lower than that of modem pool 75 illustrated in FIG. 2 (if, for example, WAN 87 could be improved to satisfy twitch video game latency requirements); because, the modem pool 75 includes the costs of the modems in the pool, the WAN interface 79, the WAN 87, and the WAN interface 89, and the server 88.

A hybrid approach of the connection pool and the modem pool is to establish connection pools at the same site as the modem pools (for example, modem pool 75). Rather than hanging up the telephone after disconnecting from the modem pool, the telephone call is transferred over to the connection pool to be connected with the telephone call of the matched-up player. After the game is completed, the telephone calls are again routed back to the modem pool.

Multiple Player Games Limited To Two Sites

Certain multi-player (i.e. more than two-player) twitch video games are well-suited for players to be grouped at two sites. Although such games involve multiple players, the players are typically organized into two teams or other such grouping so that it is natural for two or more players to be at a given location, while two or more other players are at another location.

An example of such a game is "NBA JAM™," distributed by "ACCLAIM™", Inc. for the "SEGA GENESIS™" and "SUPER NINTENDO ENTERTAINMENT SYSTEM™". In these versions of NBA Jam game, there are two basketball teams of two players each. With a special adapter, the Sega or Nintendo controller ports can be extended to accommodate four simultaneous controllers to allow four players to participate at once.

A modified version of NBA Jam that supported communication through a modem would be well-suited to run at two sites, each site accommodating the two players for a given team. In this way each team would be physically separated from the other, allowing teammates to discuss strategy out of earshot of their opponents.

The presently preferred embodiment, discussed previously, directly supports two-site, multi-player games. From the point of view of the server 121, the computers 59–74, and the client software within the computers 59–74 as illustrated in FIG. 2, the matching-up of players, the interaction with the telephone lines, the communication between two computers 59–74, and the reporting of the results back to the i.e., server 121 is the same. The only difference is that the data rate between the two computers 59–74 would presumably be higher during the play of the game given that more people are playing at once.

Multiple Player Games At Multiple Sites

Certain multi-player (i.e. more than two-player) twitch video games are well-suited for players that are located at multiple sites. Such games often involve many players, each of whom is an independent participant in the game.

Examples of such games are numerous. For example, such games include: car racing games where each player is controlling a car in a multi-car race, or dogfight games where each player is controlling an airplane in a multi-airplane dogfight.

The presently preferred embodiment, discussed previously, supports multi-player, multi-site games with certain small modifications. But, prior to discussing these modifications, we must first establish the technological basis of multi-site communications.

In the paragraphs following: a) we shall establish practical methods for connecting multiple sites in a conference call, and b) we shall establish how multiple modems can communicate with each other while connected in a conference call.

Clearly, a simple telephone call can only connect two parties at once. Because most residential homes have only a single telephone line, with a simple telephone call being the means of communication during game play, it is not currently possible to connect more than two sites together for a twitch video game using a simple telephone call.

One solution to support multi-player, multi-site games is an extension of the connection pool approach discussed previously. Rather than the connection pool being limited to connecting two telephone calls together, it would be capable of connecting multiple telephone calls together, using commercially available conference call technology. Of course, as discussed previously, this solution has economic disadvantages relative to direct residence-to-residence calls; because, there is the added cost of a business telephone line for each player's incoming call. Further, there is the capital equipment cost of conference call equipment which, given the potential hundreds of thousands of simultaneous multi-player games throughout the United States alone, would easily run into the hundreds of millions of dollars.

Another solution supporting multi-player, multi-site games is to utilize a conventional "Custom Calling" feature available in many areas of the United States and other countries: 3-way Calling. 3-way Calling permits a single residential or business telephone line to be connected in a conference call with two other sites. Referring to FIG. 2, if the telephone line of a given user of computer (59–74), User A, has 3-way Calling capability, it is quite simple for User A's client software running in computer (59–74) to direct User A's computer (59–74) to 1) dial a second User B, 2)

dial a third User C, and 3) activate 3-way Calling to connect all three Users (A, B, and C) in a conference call. Such a configuration has an economic advantage over the connection pool configuration discussed above; because, the 3-way Calling configuration is billed at residential rates. There is no need for a separate business telephone line to accommodate each player, and there is no additional capital equipment investment required beyond the equipment provided by the existing telephone network. Of course, this solution is limited to three-site multi-player games, a marginal improvement over two-site multiplayer games.

This 3-way Calling concept can be extended, however, in geographical areas where the 3-way Calling feature allows multiple 3-way callers to be linked together. Consider the example illustrated in FIGS. 8 through 11 and described below.

Figure 8:
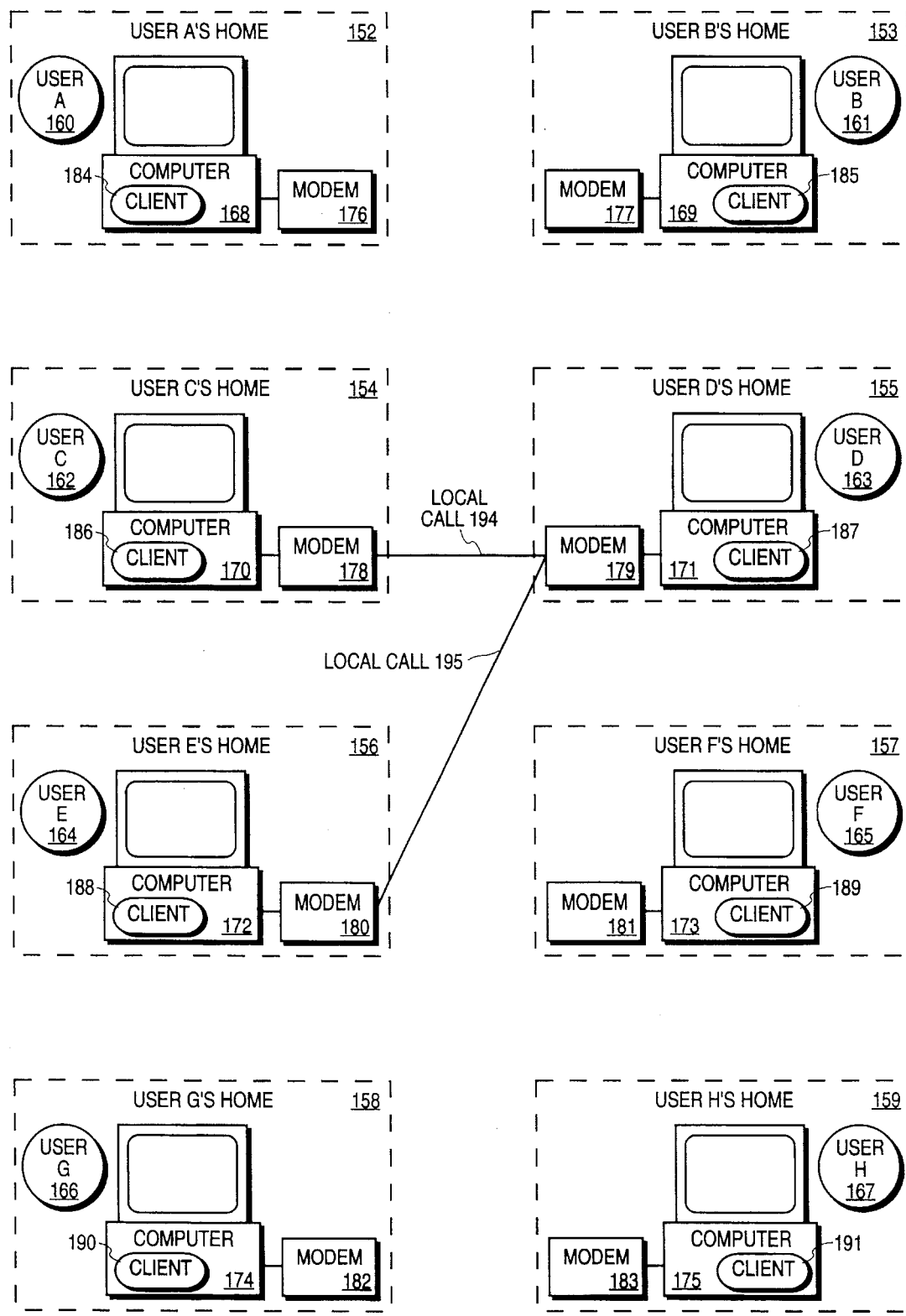
FIGS. 8–11 illustrate an example of multi-site conference calling achieved through successive 3-way calling connections as used in the present invention.

In FIG. 8, eight user sites (152–159) are shown, each containing a computer (Computers 168–175 with Modems 176–183) running client application software denoted clients (184–191). Clients (184–191) represent software systems similar to described previously in client 133 and 137, illustrated in FIG. 4 and described above. Clients (184–191) includes improvements to support 3-way calling operation. As in the presently preferred embodiment, all eight computers (168–175) illustrated in FIG. 8, under control of their clients (184–191), connect with a server (not shown) through the same connection means as described above in relation to FIGS. 2 and 4. The server used by user systems (152–159) in FIG. 8 is similar to server 122 illustrated in FIG. 4, except the server includes improvements to match up multiple players instead of simply two players.

For the sake of this example, we shall assume that the improved server matches up the eight Users, A through H (160–167) to play a multi-site multi-player twitch video game together. Once thus matched up, the clients (184–191) of all eight Users logout from the improved server and hang up the telephone line. As shown in FIG. 8, all clients (184–186, 188–191) except that of User D (187) wait to be called. User D client 187 directs its computer 171 to call User C.

Upon being notified of the ring, User C client 186 directs its computer 170 to answer the phone, and using the methods described previously, establishes a physical modem connection between User C Modem 178 and User D Modem 179 on direct telephone line 194. User C client 186 then establishes and verifies (by exchanging identification codes) a communication connection between itself and User D client 187.

At this point, User D client 187 and User C client 186 temporarily disconnect their Modems 179 and 178 from communicating with each other. User D client 187 toggles to another phone line (by means of the conventional 3-way Calling feature—usually by briefly activating the switchhook). User D client 187 then calls User E 164.

Upon being notified of the ring, User E client 188 directs its computer 172 to answer the phone, and using the methods described previously, establishes a physical modem connection between User E Modem 180 and User D Modem 179 on direct telephone line 195. User E client 188 then establishes and verifies (by exchanging identification codes) a communication connection between itself and User D Client 187.

At this point, User D client 187 and User E client 188 temporarily disconnect their Modems 179 and 180 from communicating with each other. User D client 187 connects User C's Modem 178, User E's Modem 180, and its own Modem 179 into a conference call (by means of the conventional 3-way Calling feature—usually by briefly activating the switchhook).

Figure 9:
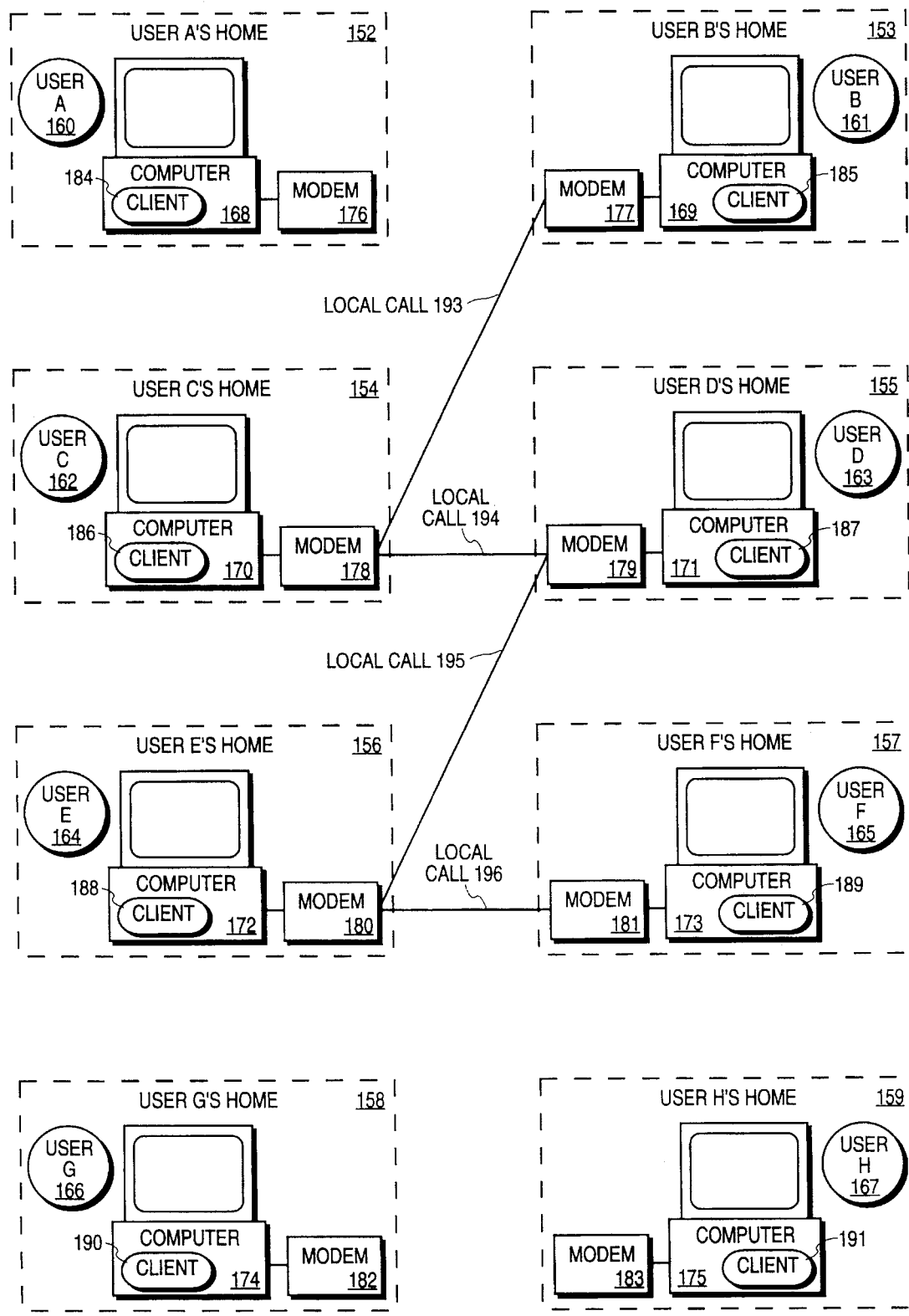

If we now consider FIG. 9, the conference call continues to expand in the following manner.

User C client 186 toggles to another phone line in the conventional manner and calls User B 161. Upon being notified of the ring, User B client 185 directs its computer 169 to answer the phone, and using the methods described previously, establishes a physical modem connection between User B Modem 177 and User C Modem 178 on direct telephone line 193. User B client 185 then establishes and verifies (by exchanging identification codes) a communication connection between itself and User C Client 186.

At this point, User C client 186 and User B client 185 temporarily disconnect their Modems 178 and 177 from communicating with each other. User C client 186 connects User B's Modem 177, User D's Modem 179, User E's Modem 180, and its own Modem 178 into a conference call (by means of the conventional 3-way Calling feature—usually by briefly activating the switchhook).

Figure 10:
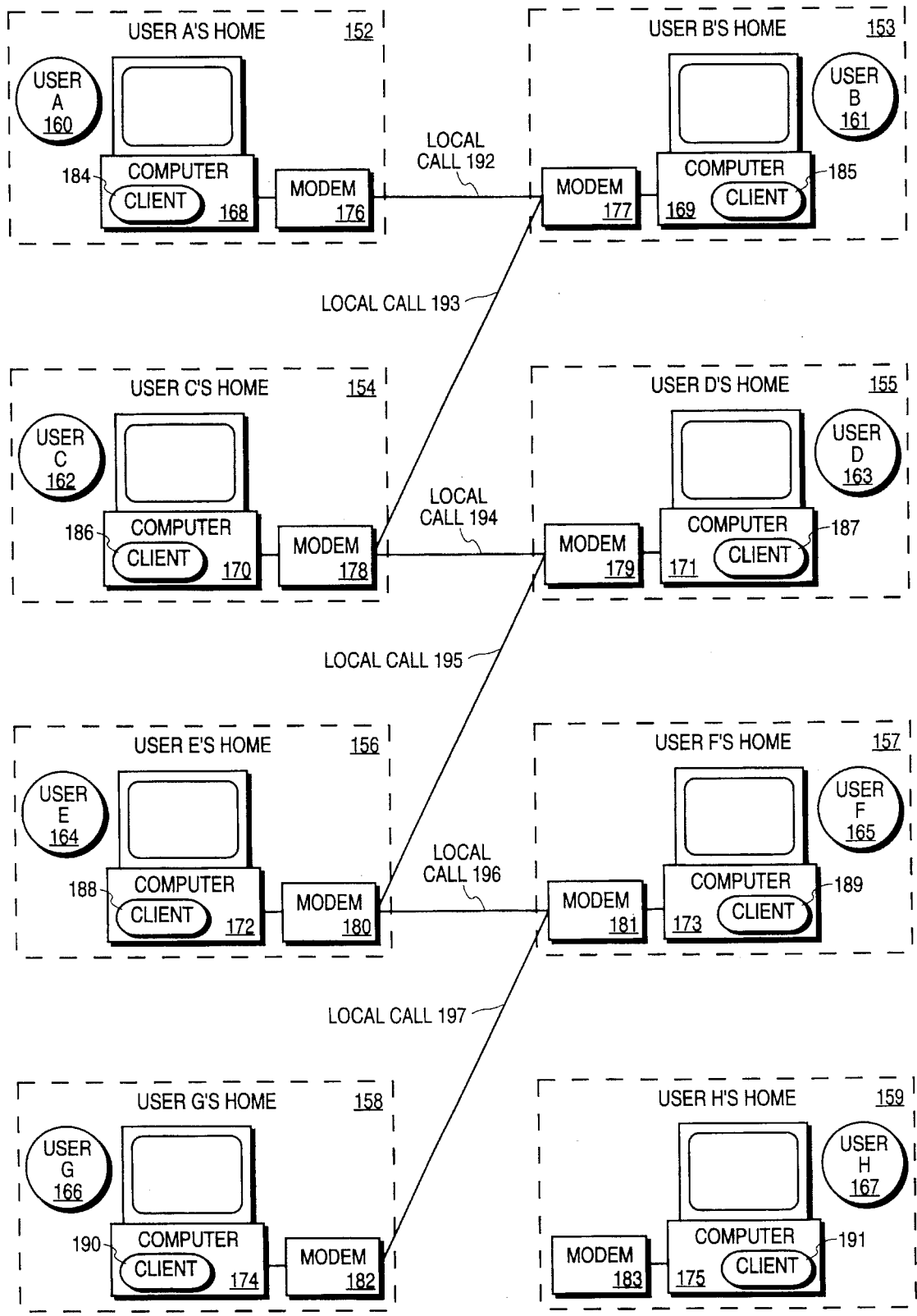
Figure 11:
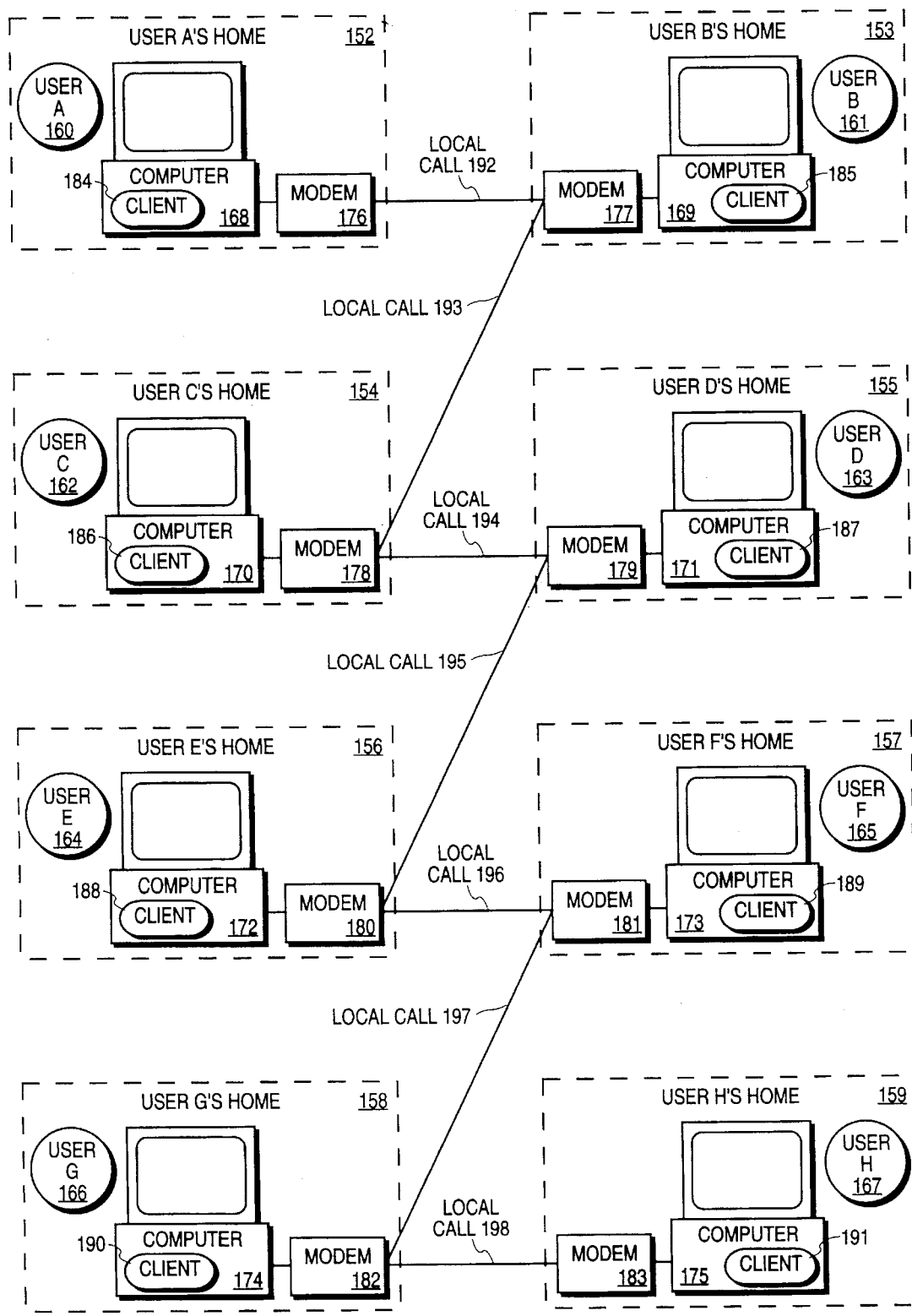

In a like manner User E's client 188 brings User F's Modem 181 into the conference call, and in a like manner, as shown in FIGS. 10 and 11, each of the other Users' Modems (176, 182, and 183) are brought into the conference call. In the end as shown in FIG. 11, all eight Modems (176–183) are connected into an eight-party conference call consisting of seven local calls (192–198). Thus, by utilizing conventional residential 3-way calling services, an eight-party, residential-rate conference call among eight players in a twitch video game is thereby established. It will be apparent to those of ordinary skill in the art that more or less than eight players may be connected in this manner.

Now that we have established a mechanism by which we may connect multiple modems to a single telephone line representing a shared telephone-grade audio band, we must now describe how these multiple modems can communicate among each other simultaneously. There are several possible approaches to the problem of simultaneous multi-party communication on a shared band which are applicable to a conference call among several modems. The preferred embodiment is presented below.

Figure 12:
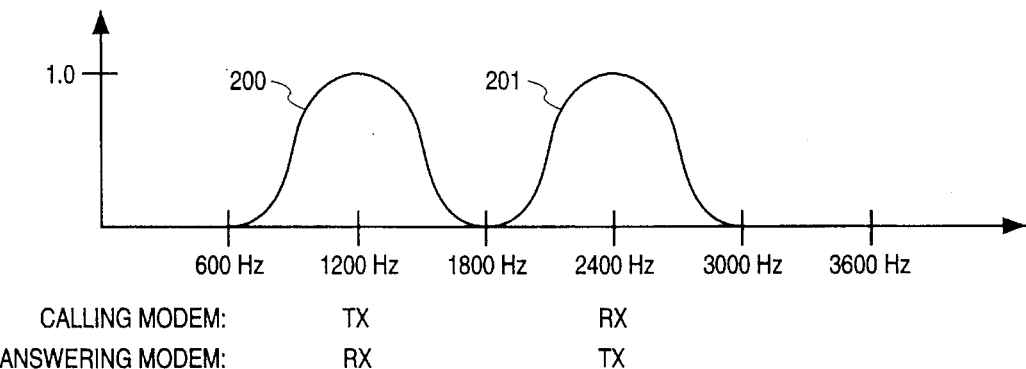
FIG. 12 illustrates a prior art method of allocating modulation bands for a modem.
Figure 13:
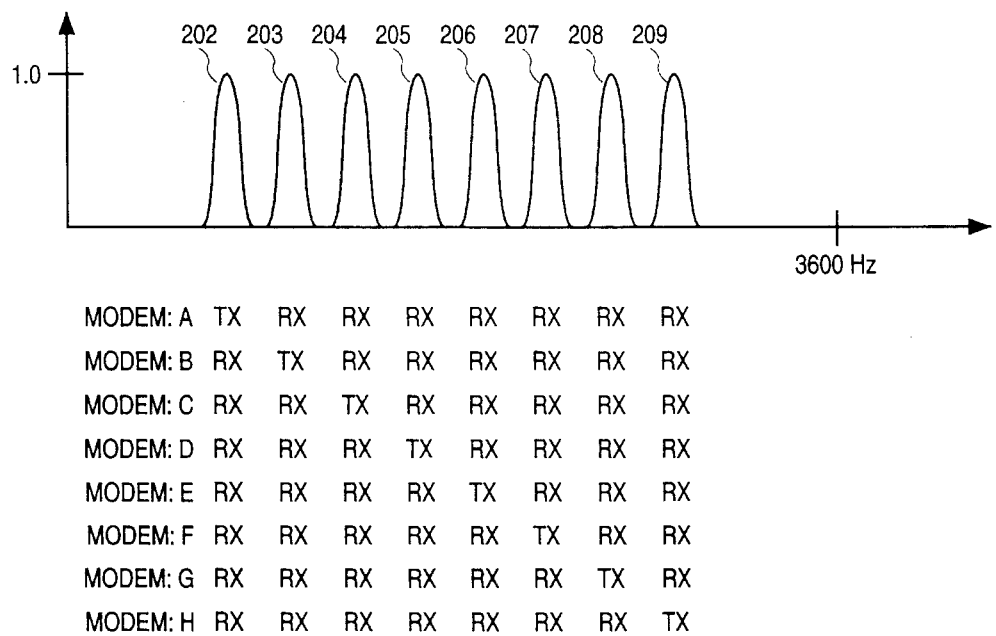
FIG. 13 illustrates modulation band allocations for a conference call multi-site modem as used in the present invention.

Prior art low-speed full duplex modem protocols such as "BELL™" 103 (300 bits per second (bps)), CCITT V.22 (1200 bps), CCITT V.22bis (2400 bps) use the principle of Frequency-Division Multiplexing (FDM) to achieve two simultaneous, non-interfering data communication channels in different frequency sub-bands within the single band of the telephone call. The prior art voltage spectra of V.22 and V.22bis are shown as an example in FIG. 12. In the case of V.22 and V.22bis, the total telephone channel bandwidth is divided between a sub-band 200 below 1800 Hz (with modulation centered at 1200 Hz) and a sub-band 201 above 1800 Hz (with modulation centered at 2400 Hz). Each modem modulates an outgoing signal on one channel and, by suppressing its own outgoing channel by signal processing techniques such as digital band-pass filtering, receives and demodulates the incoming channel. In this manner, simultaneous two-way communication between two modems can be achieved on the switched telephone network. By convention, the calling modem (also known in the art as the "originating modem") transmits (TX) data in the low band 200 and receives (RX) data in the high band 201. The situation is reversed for the answering modem. Such modems in common use today achieve 2400 bps in each direction.

n-way communication among a group of modems on a shared conference call is achieved in the present invention by implementing an improvement on the two-channel FDM technique that subdivides the total telephone band into n sub-bands. An example of such an eight sub-band modem is shown in FIG. 13. A single sub-band (202–209) is allocated for each modem's outgoing (TX) data. For example, Modem A uses sub-band 202 for outgoing (TX) data. In this manner, the outgoing (TX) data from all n modems (Modems A—H in FIG. 13, corresponding to Modems 176–183 of FIGS. 8–11) is transmitted simultaneously without interference on the same conference call. Thus, each modem is responsible for simultaneously transmitting on one channel and receiving on the remaining n-1 channels. In this manner, the data transmitted by each modem is received by the other n-1 modems, providing simultaneous multi-way communication among all n modems.

Clearly, as the number of modems, n, increases, the bandwidth achievable on each channel decreases. However, twitch multi-player, multi-site video games can generally be designed such that the game software executes locally on each site's computer, with the only essential data that must be transmitted being the User's controller actuations. In the case of controllers such as those in primary use on "SEGA GENESIS™", "SUPER NINTENDO ENTERTAINMENT SYSTEM™", "3DO MULTIPLAYER™", "ATARI JAGUAR™" as well as controllers on most coin-operated video games, the full bandwidth of a user's actuation of the controller (given the limitations of human response time) can be transmitted at less than 300 bps. V.22bis, shown in FIG. 12, accomplishes 2400 bits per second (BPS) per sub-band or 4800 bps for the total telephone channel. If the total telephone channel were subdivided into 8 bands instead of two and there were no other losses in the system, 4800÷8=600 bps could be achieved per sub-band. Even given a 50% loss of channel utilization, 300 bps could be achieved, still a very reasonable data rate for a ,typical twitch video game.

The identification of each modem A through H, so as to determine appropriate channel allocation, is accomplished through a variety of means. In the preferred embodiment, given the 3-way Calling connection sequence previously described, the server, such as server 122 in FIG. 4, tags each Modem 176–183 of FIGS. 8–11 uniquely at the time the Users are matched up.

Thus, the mechanisms for accomplishing multi-site multi-player twitch video games using standard 3-way Calling services with local residential telephone calls has been shown.

Note that the same mechanisms could be used to accomplish multi-site multi-player twitch video games using standard 3-way Calling services with long-distance telephone calls. If all of the players are a long distance from each other, all of the telephone calls 192–198 of FIG. 11 would be long-distance. If the players are grouped in local areas, the groups would be connected among each other through local calls, and those groups would be linked together through long-distance calls. Note that long-distance calls typically result in more latency that local calls. In such cases, all data received by modems 176–183 must be delayed in the receiving computer (168–175) so as to be synchronized with the longest latency path in the network. In this way, data latency from each computer (168–175) to each computer (168–175) will be uniform, despite non-uniform latency from each modem (176–183). An example of such a scenario is shown in FIG. 14.

Figure 14:
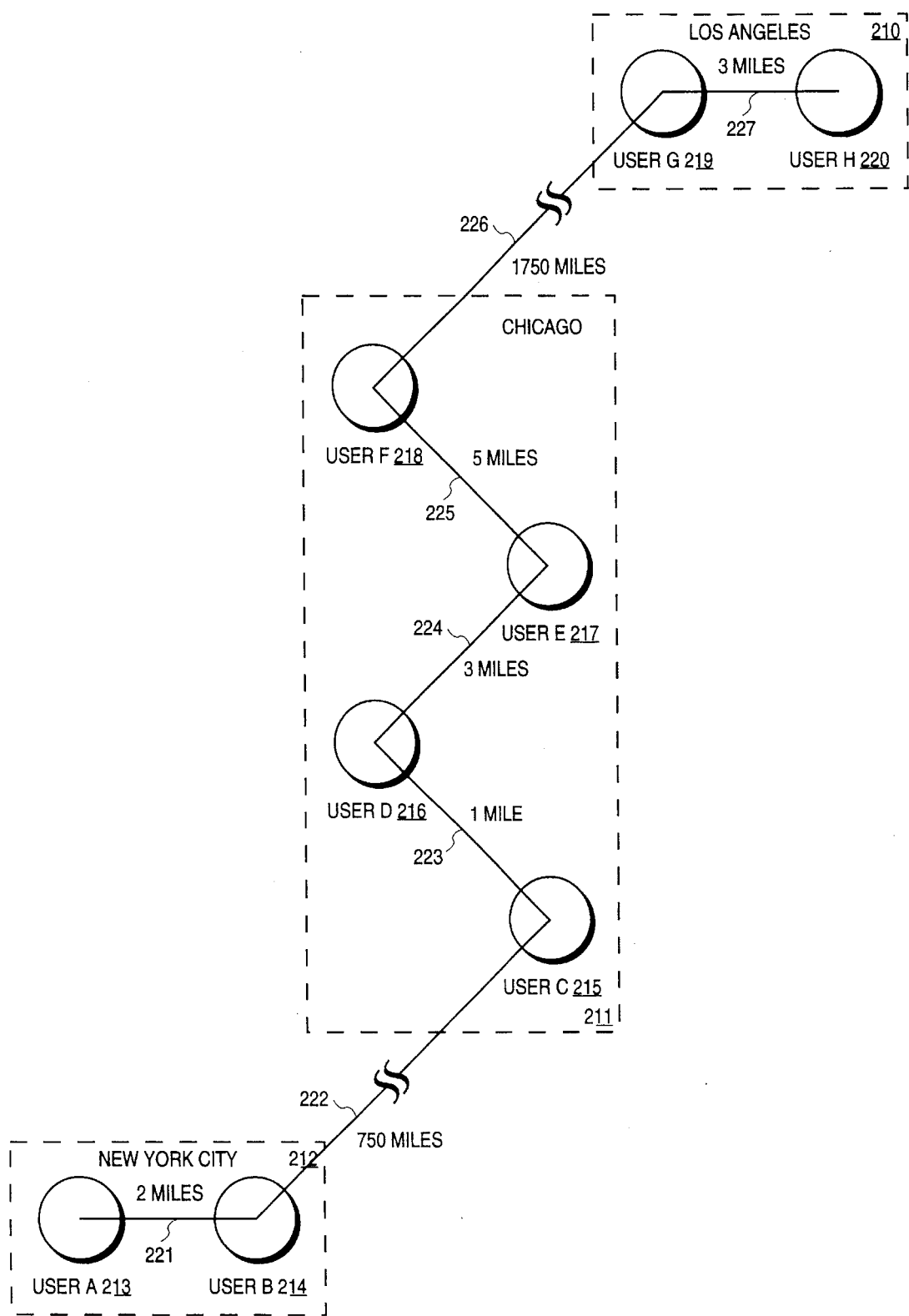
FIG. 14 illustrates the latency problem in a long-distance multi-site conference call.

Referring to FIG. 14, conference calls that have long distance legs such as 222 and 226 in FIG. 14 may not exhibit uniform latency between every two users. Consider the distance between User A (213) and User B (214) versus the distance between User A (213) and User H (220). Even if the telephone network were to propagate signals as fast the speed of light in a vacuum (approximately 186000 miles/second) and the telephone network's switching equipment introduced no latencies, the signal from User A's (213) modem would arrive at User B's (214) modem approximately 13.5 milliseconds (msec) sooner than at User H's (220) modem. 13.5 msecs is almost as long as a typical video game frame time (16.67 msec). Given realistic signal propagation delays through fiberoptics and copper wire as well as switching equipment latencies, User A's (213) controller input would have at least a one video frame rime longer latency to reach User H (220) than to reach User B (214).

Because video games typically use one video frame time as a sampling window for reading user input, the difference of one frame time from receiving various players' inputs at different sites could easily result in a completely different game behavior at each site. In the example of FIG. 14, User B's (214) and User H's (220) video games would likely fall completely out of synchronization.

To compensate for this problem, all data received by the modems of Users A—H (213–220) is delayed by the client software in the receiving computers of Users A—H (213-220) so as to compensate for the longest latency path in the network. In FIG. 14, the client of User H's (220) computer would introduce no delay to data received from User A (213); because, it is the longest path. User B's (214) client, however, introduces a substantial delay to data received from User A (213). Notably, User A's (213) client also introduces a substantial delay to User A's (213) own input data before utilizing its input data in the video game running on User A's (213) own computer. Of course, every other client running on Users C—G's (215–219) computers introduces an appropriate delay to User A's (213) input data. In this way, the video games running on all Users (213–220) computers receive User A's (213) input data within the same sampling window.

The client running in each User's (213–220) computer introduces a different delay to each User's (213–220) input data to create a situation where the actions of all Users (213-220) within a given sampling window (typically one video frame time) are considered by the video games running at all sites within a common sampling window. Thus, if the worst case latency in the network shown in FIG. 14 is found to be between User A (213) and User H (220) and it is determined to be four video frame times, the client running in each User's (213–220) computer inserts the appropriate delay to the user input received from each User (213–220) so there is a four video frame time delay from the sampling of every User's (213–220) input to the consideration of the input by the video games running at the various sites. This four video frame time delay, for example, provides a uniform latency for every communications path in the network, regardless of the actual latency of each communications path.

Note that the above discussion relies on the ability of the client software of Users A—H (213–220) to determine the latency between any two points in the network. There are various methods of determining latency between two given points in a network such as that shown in FIG. 14. One such method is to assume that the latency between a given two points in the network is roughly the same in both directions, and the latency stays the same for the duration of the telephone call. That is, the latency when User A (213) is sending to User H (220) is roughly the same as when User H (220) is sending to User A (213) and will stay that way throughout the video game. This is a reasonable assumption for a telephone network call. Then, it is just a matter of User A's (213) client sending a test data packet to User H's (220) client and having User H's (220) client send it back immediately. The network latency between User A (213) and User H (220) can then be determined by User A's (213) client to be approximately equal to one-half the total round-trip time for the packet, including modem latencies. This measurement is then made between each two points in the network (there are 8×7÷2=28 such communication paths in FIG. 14) and thus latencies between every two Users (213–220) are determined.

Note that the above modem to accomplish multi-site multi-player communications suitable for twitch video games can be applied to many types of shared communication channels in addition to conference-called telephone lines. For example, a radio frequency (RF) communication channel can be utilized in the same manner, with various users within transmission range of one another, each user transmitting data on one band while receiving data from a plurality of other users that are each transmitting in a distinct band. Also, the same approach could be utilized for the RF channel contained within a coaxial cable such as that used to carry cable TV signals.

Additionally, an infrared communications channel could be utilized in the same manner, with a plurality of users all in the same room, each transmitting on one band while receiving data from a plurality of other users that are each transmitting on a distinct band.

Thus, the mechanisms for accomplishing multi-site multi-player twitch video games using standard 3-way Calling services with long-distance and local residential telephone calls has been shown.

Call Forwarding for User Privacy

One issue with the improved network shown in FIG. 2 is that there is the possibility of a user's telephone number becoming known to other users with malicious intentions. A fundamental principle of the network is to enable an inexpensive, low-latency connection between two computers (in this example "computer" is defined to be a computer equipped with a communications interface, such as a modem or ethernet interface) by providing a given User A's client the telephone number of another User B's computer, and having the User A' client direct its computer to dial the telephone number and establish a direct connection between the two computers.

Because of the nature of the residential telephone network, there is no way to prevent a User A with malicious intentions from attaching a device such as a touch-tone decoder to the telephone line during the dialing and thereby obtain User B's telephone number. User A would then be able to call User B's telephone number and harass User B.

One method to prevent such unauthorized access to a phone number was presented previously: for a concerned user to direct the client (and the client would then pass on such directions to the server) that only outgoing calls are permitted. Although such an approach can certainly provide protection for some percentage of users, clearly some users will have to accept incoming calls or else no connection between users will be possible.

Another mechanism, described below, provides enhanced security without limiting a concerned user to outgoing calls only, at only a small cost. This mechanism is based on Call Forwarding.

Call Forwarding is typically used for redirecting a phone number's incoming calls to a different phone number for a period of time. For example, a physician may forward her office telephone calls to an answering service after hours so if a patient calls in an emergency, someone will be there to answer the call. We describe here a new way of utilizing Call Forwarding: to provide anonymity for calls from one networked video game player to another. First, let's consider how Call Forwarding operates on a typical telephone line.

Call Forwarding is a Custom Calling feature available for residential and business telephone lines in many calling areas in the United States. The way it operates in, for example, Mountain View, Calif. is the following: A residential or business telephone line (hereinafter called the "forwarding line") is enabled with the Call Forwarding feature by ordering the feature from Pacific Bell, the local Regional Bell Operating Company (RBOC). To activate Call Forwarding, the user of the forwarding line (called hereinafter the "forwarding user") dials 72#, on a touch-tone telephone. The forwarding line responds with a second dial tone. Then, the forwarding user dials the telephone number to which calls are to be forwarded. For the sake of notifying a user at the forwarding destination (hereinafter called the "destination user"), the telephone at the forwarding destination rings (hereinafter called the "destination line"). If it is answered, Call Forwarding is activated. If there is no answer or if there is a busy signal, the forwarding user hangs up the telephone, and dials 72# and the number of the forwarding destination again. This second call activates Call Forwarding. Once Call Forwarding is activated, whenever there is a call made to the forwarding line, it is transferred ("forwarded") to the destination line. Also, to remind the forwarding user that Call Forwarding is activated, the forwarding line rings briefly whenever a call is forwarded. The forwarding user can change the forwarding destination by following the above procedure with a different destination telephone number, or the forwarding user can deactivate Call Waiting by dialing 73#.

An important detail to note is that if the forwarding line is a business telephone line, then all forwarded calls will be charged to the forwarding line at the standard business line billing rates, even if a forwarded call originates from a residential telephone and is forwarded within the original call's local calling area. That is, a residential call loses its "residential status" as soon as it is forwarded by a business telephone line. Thus, a business telephone line with Call Forwarding can incur significant billing charges, even it is exclusively used to forward residential calls.

In the following section, we explain how Call Forwarding, and like network functions, can provide user anonymity in a two-player, networked game. By viewing the telephone system as a network, with telephone numbers as addresses in the network, we can consider Call Forwarding as a network operation and better understand how we may use it to provide anonymity to the destination user. Such network nomenclature is used in the following description.

Figure 22:
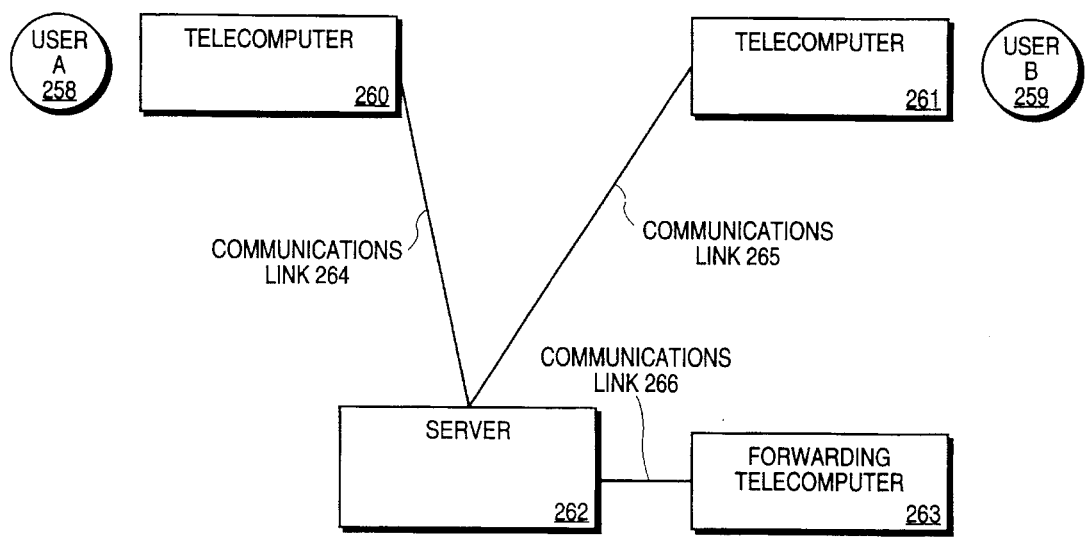
FIG. 22 illustrates an example of the use of a forwarding computer to maintain user privacy in the network of the present invention.

FIG. 22 shows two video game players, USERS A and B 258 and 259 whose computers 260 and 261 are connected to server 262 though communication links (either telephone lines or other communication means) 264 and 265 so as to be matched to play a two-player video game. The state of this diagram corresponds to that of FIG. 5 with one important exception, rather than the server 262 uploading to computer 260 the network address (e.g. telephone number or other network address) of USER B 259, the server 262 uploads to computer 260 the network address of the forwarding computer 263. Meanwhile, the server 262 uploads through communication link 266 to forwarding computer 263 the network address of USER B 259.

Depending on whether the network being utilized is a circuit-switched network (such as the telephone network, or a virtual circuit switched network such as ISDN) or a packet-switched network (such as ethernet or LocalTalk), the subsequent forwarding of USER A's 260 connection to USER B 261 is accomplished in one of two ways.

Figure 23:
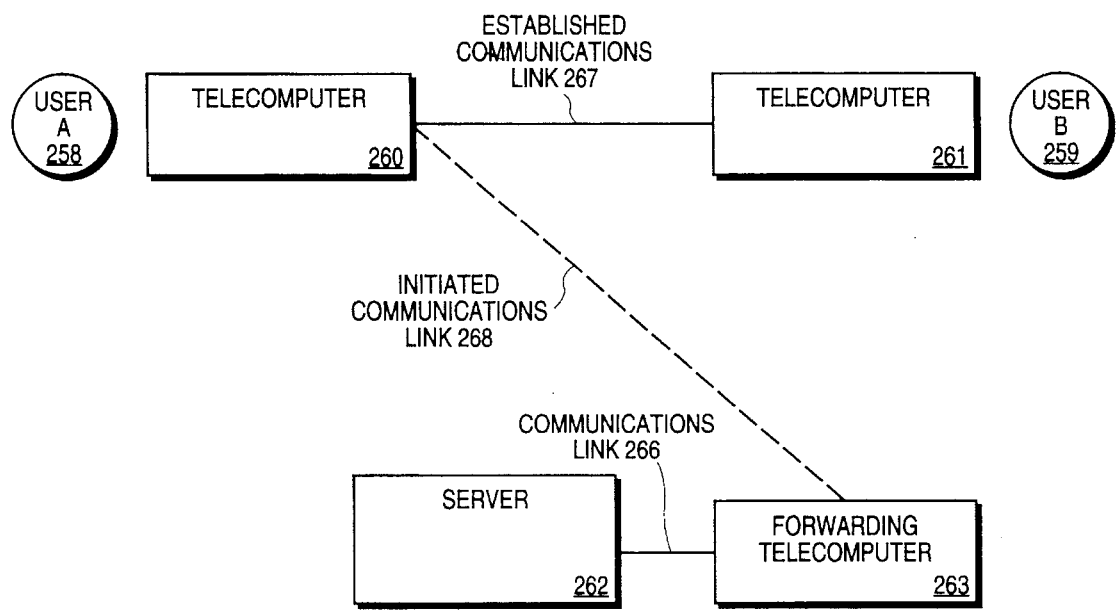
FIG. 23 illustrates an example of the use of a forwarding computer in a circuit-switched network.

1) FIG. 23 shows the forwarding operation in a circuit-switched network. Forwarding computer 263 establishes the network address of computer 261 as the forwarding destination of all attempted connections to itself (in the telephone example above, it would dial #72 followed by USER B'S 259 phone number, etc. as described above). Computer 260 then initiates a communications link 268 to forwarding computer 263 (in the telephone example above, it would dial the telephone number of forwarding computer 263). Because computer 261 has been established as the forwarding destination for forwarding computer 263, communications link 268 is never established. Instead, communications link 267 is established, without computer 260 ever knowing the network address of computer 261 and thereby maintaining USER B'S 259 anonymity. Note that once the connection has been made, forwarding computer 263 is no longer involved in the connection, and can be directed by server 262 to establish forwarding to a different network address. In this way, the same forwarding computer 263 could be used to forward communications links for other computers (not shown in this figure), simultaneously while previously forwarded communication links (such as 267) are still in progress.

Figure 24:
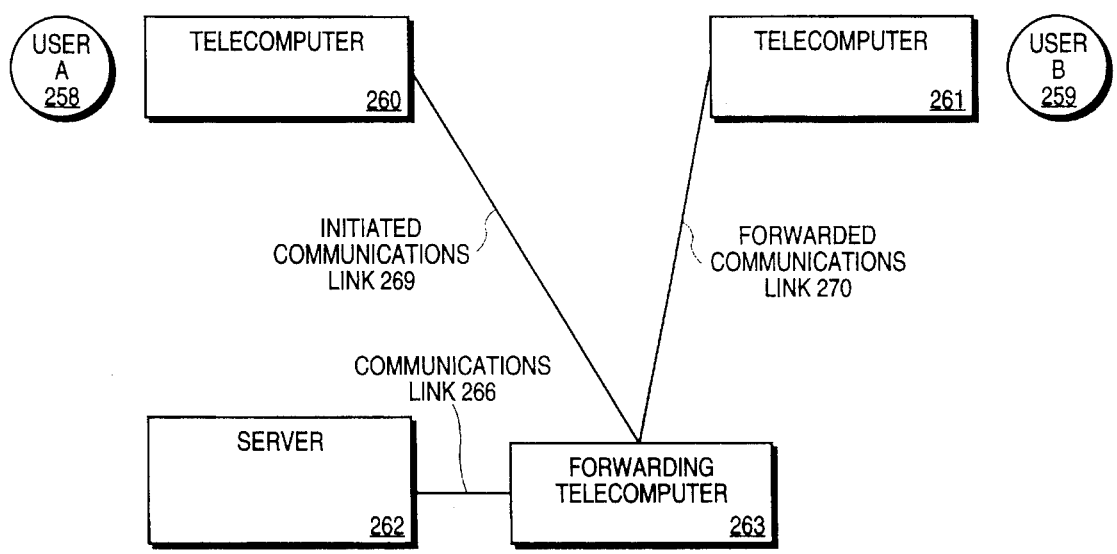
FIG. 24 illustrates an example of the use of a forwarding computer in a packet-switched network.

2) FIG. 24 shows the forwarding operation in a packet-switched network. Like the circuit-switched forwarding example, computer 260 initiates a communications link 269 to forwarding computer 263. However, in a packet-switched network the initiated communications link 269 is established to the forwarding computer 263. Then, the forwarding computer 263 establishes a communications link 270 to computer 261, and from thereon forwards (i.e. receives and retransmits) data in both directions between computers 260 and 261. Neither computer 260 nor 261 is provided with the network address of the other, and therefore anonymity is maintained between USERS A and B 258 and 259.

Some details about the operation of forwarding computer 263 in a telephone network are important to mention.

1) To avoid ringing at USER B'S 259 telephone number when Call Forwarding activation is attempted, the server 262 can direct the forwarding computer 263 to establish Call Forwarding prior to computer's 261 disconnection from the server 262. Thus, USER B'S 259 telephone number will be busy when Call Forwarding activation is attempted, and with a second attempted activation, Call Forwarding will be activated (again without USER B'S 259 telephone ringing). Only then will server 262 direct computer 261 to hang up the phone and await an incoming call.

2) When computer 260 initiates the call to forwarding computer 263 and is forwarded to computer 261, there will be a brief ring on forwarding computer's 263 telephone line. This will notify forwarding computer 263 that the forwarding operation has been completed, and it can then notify server 262 through communications link 266 that it is available to forward another call.

3) Communications link 266 may be a different network than the telephone network. Since it is cost-efficient to reuse the same forwarding computer 263 for forwarding calls as rapidly as possible (so as to minimize the number of forwarding computers needed to support a large community of users), it is likely that communications link 266 will be a permanent connection (at least during peak hours), and other communications means (e.g. T1 lines) may be less expensive for constant use than telephone lines.

4) In a realistic scenario, forwarding computer 263 would be located at a business installation and would have a business telephone number. Given this situation, forwarding computer's 263 telephone line would be assessed normal business telephone charges for the duration of each forwarded call. If the same forwarding computer 263 were rapidly re-utilized as described in paragraph 3, above, so as to have several simultaneous forwarded telephone calls, its telephone line would be assessed normal business charges for all active calls. For example if forwarding computer 263 forwarded ten simultaneous calls, its telephone line would be assessed ten times the business telephone rate while all ten calls were active. Thus, utilizing the Call Forwarding method just described comes at a significant cost relative to the residential rates available when making a direct call between USER A 258 and USER B 259. One way to reduce this cost is to see if both USER A 258 and USER B 259 require complete anonymity. If, for example, USER A 258 is not concerned about complete anonymity, but USER B 259 is, then it would be cheaper for server 262 to direct computer 261 to call computer 260 without forwarding, and USER B'S 259 anonymity would be maintained. And, vice-versa, if USER A 258 required complete anonymity, but USER B 259 did not, then server 262 could direct computer 260 to call computer 261 without forwarding and USER A'S anonymity would be maintained. The only time Call Forwarding would be required would be if both USER A 258 and USER B 259 required complete anonymity. If Call Forwarding only were utilized in this situation with direct calls utilized in other cases, significant savings could be possible.

In both the circuit-switched and packet-switched network example, the same forwarding principles can be applied to multi-player (i.e. more than two player) games. The exact same matchmaking and forwarding mechanism just described for two players would be used for multiple players, except that, given the multiple connections that must be made, a forwarding device would be needed to forward each connection made between the players. In the case of the circuit-switched network, either multiple forwarding computers or a single one used rapidly in sequence could be used. In the case of a packet-switched network, either multiple forwarding computers, or a single one timeshared among all players, could be used.

Thus, a mechanism for utilizing Call Forwarding to achieve anonymity between users of multi-player networked games has been described.

Avoiding Ringing on Extension Telephones

One drawback of the improved network shown in FIG. 2 is that when a direct telephone call is initiated between two computers, the telephone line of the answering computer rings before the answering computer answers. This situation is shown in FIG. 6, when USER A'S 131 modem 134 calls USER B'S 138 modem 135 via local call 146.

If the answering computer (computer 136 and modem 135 in FIG. 6) is connected to a dedicated telephone line, there is no issue with the telephone line ringing; because, there will be no ringing sound (i.e. the ringing signal will be detected by modem 135, but it would not activate an audible ringing). But, if the telephone line attached to modem 135 is a telephone line shared with one or more extension telephones, then these telephones will generate an audible ring after local call 146 is dialed. Such an audible ring is undesirable because 1) it might stimulate other inhabitants of USER B'S home 141 to answer the phone (and thereby intefere with communications between modems 134 and 135 as well as subject the person answering the phone to unpleasant modem sounds), and 2) the ringing sound might simply disturb other inhabitants of USER B'S home 141 (for example, if the ringing occurs at 2 AM).

One way to avoid an auditory ringing on the answering computer's telephone line is to utilize a Custom Calling telephone feature available in many areas of the United States called Call Waiting. Call Waiting operates in the following manner: Consider the situation when a telephone line equipped with Call Waiting (hereinafter called the "Call Waiting line") is in the midst of an active telephone call with a second party and a third party dials the Call Waiting line. Normally, the third party would hear a busy signal, but with Call Waiting the third party will hear a normal ringing sound and the user of the Call Waiting line (hereinafter called the "first party") will hear a "bong" tone indicating there is an incoming call. At this point the first party can flip the telephone switchhook briefly (an action hereinafter called "flashing"), and this action puts the second party on hold and connects the first party to the third party in a separate telephone call. It is important to note that the telephone connection between the first party and third party is established without the telephone ringing at the first party's location.

Figure 25:
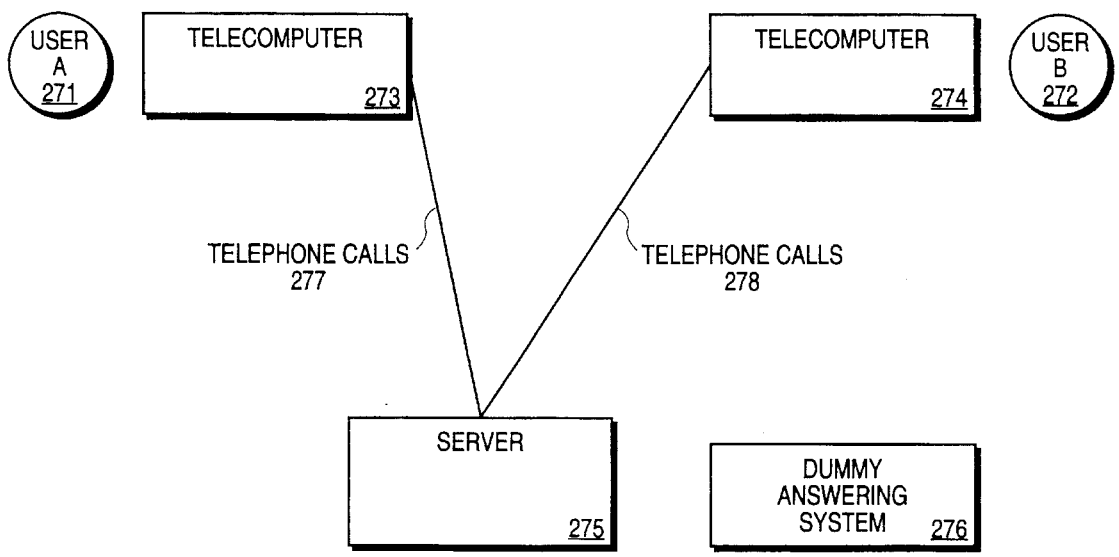
FIGS. 25–28 illustrate an example of the use of a dummy computer with Call Waiting or a combination of Call Waiting and Three-way calling to provide multi-player connections without an audible ringing on extension telephones.

The Call Waiting feature just described can be utilized in the improved network shown in FIG. 2 to avoid an auditory ringing on extension phones connecting to the answering computer. FIG. 25 shows a scenario similar to that shown previously in FIG. 5 with the principal differences being that 1) the telephone line attached to USER B'S 272 computer 274 is equipped with Call Waiting, and 2) there is a dummy answering system 276 whose telephone number is known to computer 274.

The dummy answering system 276 is defined here to be a device at some telephone number that will answer an incoming call and not hang up for at least a brief period of time. An example of such a dummy answering system would be the time of day telephone service (such as 415-767-2676) provided by the local telephone company. When called, the time of day service answers the telephone and announces the time of day repeatedly every ten seconds for about one minute, after which it hangs up. Other dummy answering systems could be utilized (for example many 1-800 numbers are simply answering machines with fixed announcements) or dummy answering systems could be installed specifically for the purpose of performing the function of answering the telephone and not hanging up for a specified period of time. And, ideally, an arrangement could be made with the local Regional Bell Operating Company (RBOC) to provide a telephone number that is simply answered with silence to serve as a dummy answering system.

In FIG. 25, USERS A and B 271 and 272 are matched to play each other by server 275, and USER B'S telephone number is uploaded from server 275 to computer 273, in accordance with the methods described previously.

Figure 26:
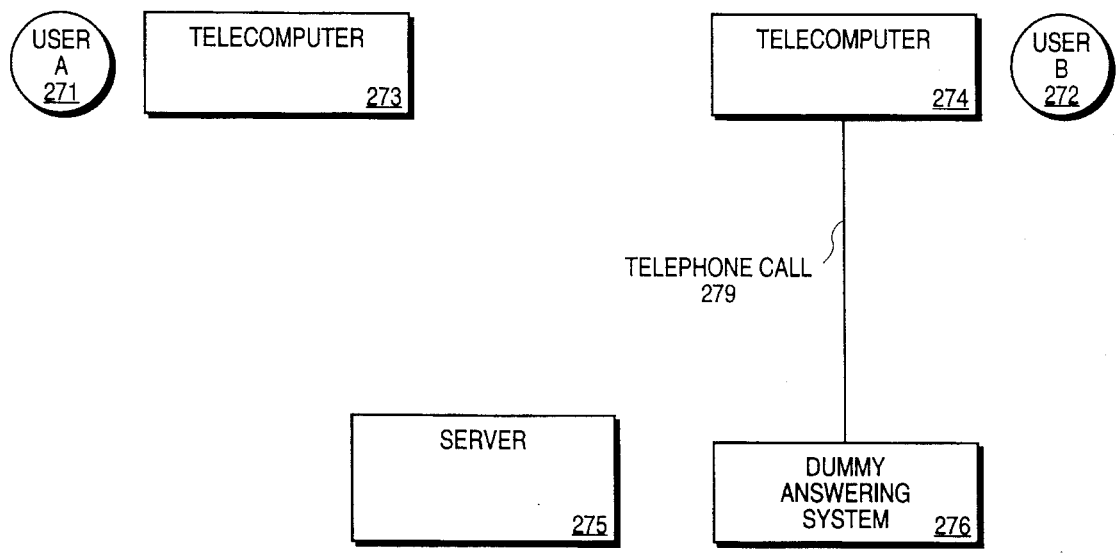

In FIG. 26, both computers 273 and 274 disconnect from server 275. Then, prior to computer 273 calling computer 274, computer 274 calls dummy answering system 276. Dummy answering system 276 answers incoming call 279 and does not hang up for at least a brief period of time.

Figure 27:
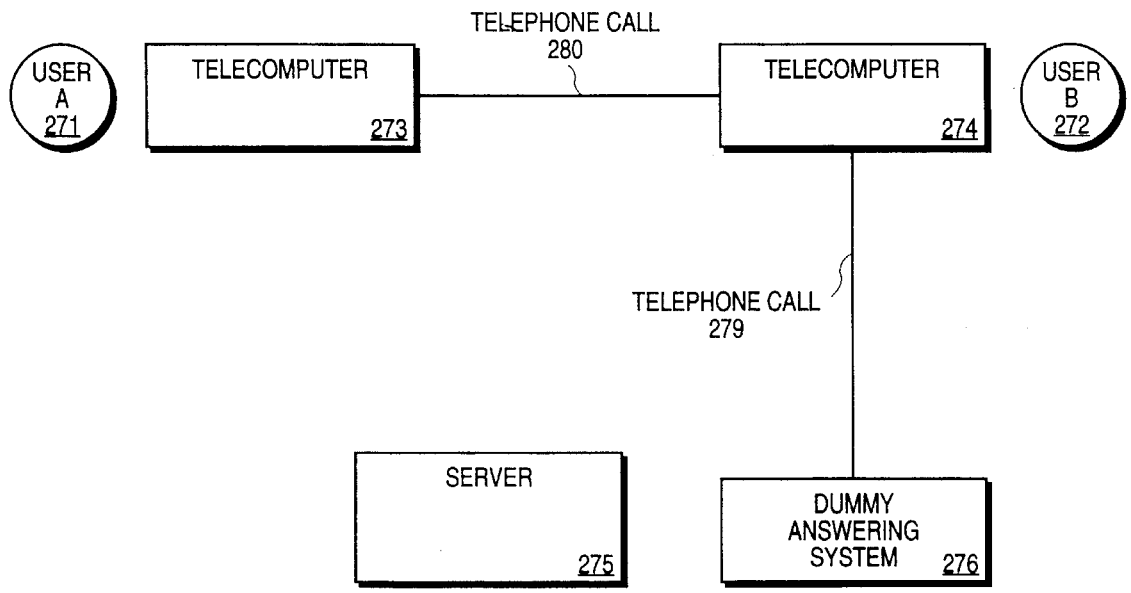

In FIG. 27, computer 273 calls computer 274. Because computer 274 has an active telephone call 279 to dummy answering system 276, the incoming telephone call 280 results in a Call Waiting "Bong" rather than a ringing signal computer 274 detects the Call Waiting "Bong" and flashes the switchhook, thereby answering incoming telephone call 280 and establishing a connection with computer 273.

Figure 28:
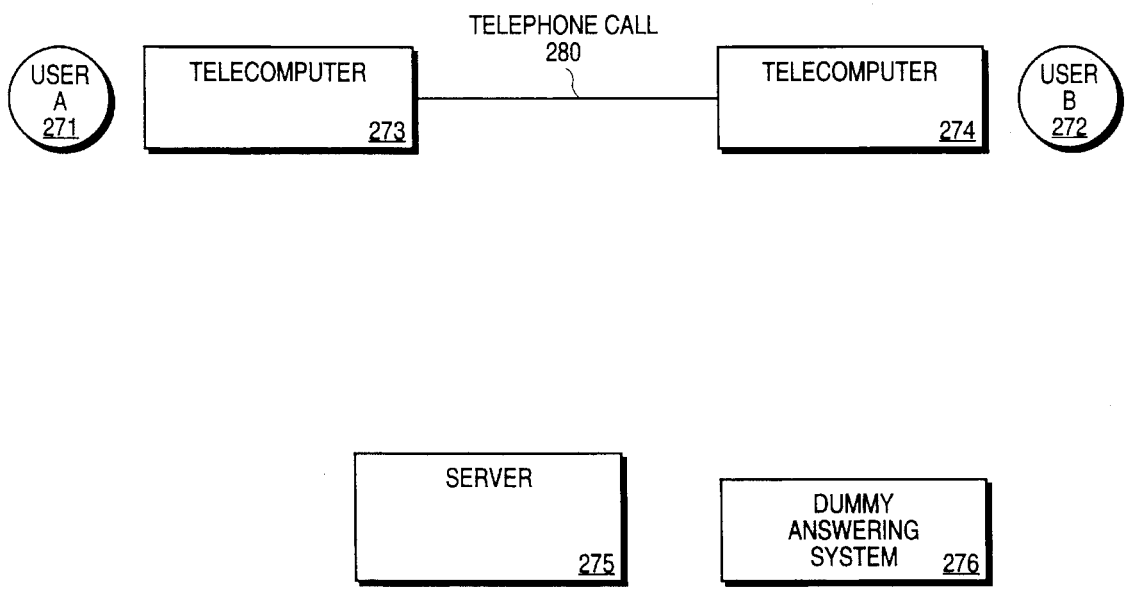

In FIG. 28, dummy answering machine 276 hangs up, thereby disconnecting telephone call 279, and leaving only telephone call 280 active. One subtlety about dummy answering system 276 hanging up is that with some Call Waiting systems, there is a small clicking sound when the line placed on hold hangs up. Thus when telephone call 279 is disconnected by dummy answering system 276 hanging up the phone, there will be a clicking sound on telephone call 280. Such a clicking sound might disrupt the modem communications between computers 273 and 274, so it would be best that dummy answering system 276 hangs up immediately after computer 274 flashes the switchhook and connects to telephone call 280, before the modems of computers 273 and 274 have established a connection.

One issue that exists with the method described above and illustrated in FIGS. 25 through 27 is that since USER B'S 272 telephone line is equipped with Call Waiting, any incoming telephone call that comes in after telephone call 280 is established will result in a Call Waiting "Bong" that will disrupt the modem communications between computers 273 and 274. Many Call Waiting systems provide a means for Call Waiting to be deactivated on outgoing calls, but since the telephone call 280 is an incoming call to USER B'S 272 telephone line, there is no way to deactivate Call Waiting. Two solutions are proposed to this problem:

1) An incoming call will not activate the Call Waiting "Bong" if a Call Waiting line already has two telephone lines in use. That is to say, if a Call Waiting line has one telephone call on hold and one telephone call that is active, a third incoming telephone call will be met with a busy signal and will not activate the "Bong." We can utilize this characteristic by having the dummy answering machine 276 stay connected via telephone call 279 for the duration of telephone call 280 (see FIG. 27). In other words, once dummy answering machine 276 has answered incoming call 279, it never hangs up the phone—it simply waits until computer 274 hangs up the switchhook and disconnects both telephone call 280 and 279. This will effectively disable Call Waiting for the duration of telephone call 280, but it does have the disadvantage of tying up dummy answering machine's 276 telephone line for that period of time as well. (Note that in this scenario, FIG. 28 does not apply.)

2) Another Custom Calling feature available in many areas of the United States is Three-Way Calling. Three-Way Calling is typically used to establish three-person conference calls, but in some telephone areas (such as Mountain View, Calif.) when a telephone line is equipped with both Three-Way Calling and Call Waiting, it is possible to deactivate Call Waiting on an incoming call by flashing the switchhook and dialing a Call Waiting deactivation number (*70 in Mountain View, Calif.). In the situation shown in FIG. 28, the dummy answering system 276 has just hung up. If USER B'S 272 telephone line were equipped with Three-Way Calling as well as with Call Waiting, computer 274 would then flash the switchhook and dial the Call Waiting deactivation code, thereby deactivating Call Waiting for the duration of telephone call 280.

The above-described mechanisms can also be used to establish multi-player (more than two player) telephone connections without audible ringing on extension telephones as successive players are added to a multi-player conference call. A method for attaching multiple players into a conference call is described previously and is illustrated in FIGS. 8 through 11. In FIGS. 8 through 11, USERS B–G (161–166) have telephone lines equipped with Three-Way Calling and their computers (computers 169–174 with modems 176–182 successively call outward from USER D'S 163 telephone line until all 8 USERS A—H (160–167) are connected in a single conference call. But, during the course of establishing this chain, there will be an audible ring on extension phones at each answering site with an incoming call.

Consider the situation that the telephone lines of USERS A—C (160–162) and USERS E—H (164–167) are equipped with Call Waiting. If the computer at each of these sites dials into a dummy answering system, such as dummy answering system 276 shown in FIGS. 25 through 28, prior to receiving an incoming call, the incoming call will result in a Call Waiting "Bong" rather than an audible ring on extension telephones. By detecting the "Bong" and flashing the switchhook, as previously described, each computer will then connect to the incoming call. Since the telephone line of each USER B—G (161–166) is equipped with Three-Way Calling, it is possible (using the combined Call Waiting/Three-Way Calling method previously described) to then deactive Call Waiting for the duration of the telephone call.

Additionally, the Call Forwarding methods described previously and illustrated in FIGS. 22 and 23 can be combined with the audible ring elimination methods just described to provide user anonymity with no audible ring on extension telephones from incoming calls.

Thus, a method has been shown to utilize Call Waiting, or a combination of Call Waiting and Three-Way Calling to provide two-player and multi-player telephone connections without an audible ringing on extension telephones.

LAN-based Twitch Multiplayer Video Games

It is important to note that many of the mechanisms previously described for matching two or multiple players and connecting computers together directly can be applied to Local Area Networks (LANs) such as LocalTalk and Ethernet as well as the WANs described.

Figure 29:
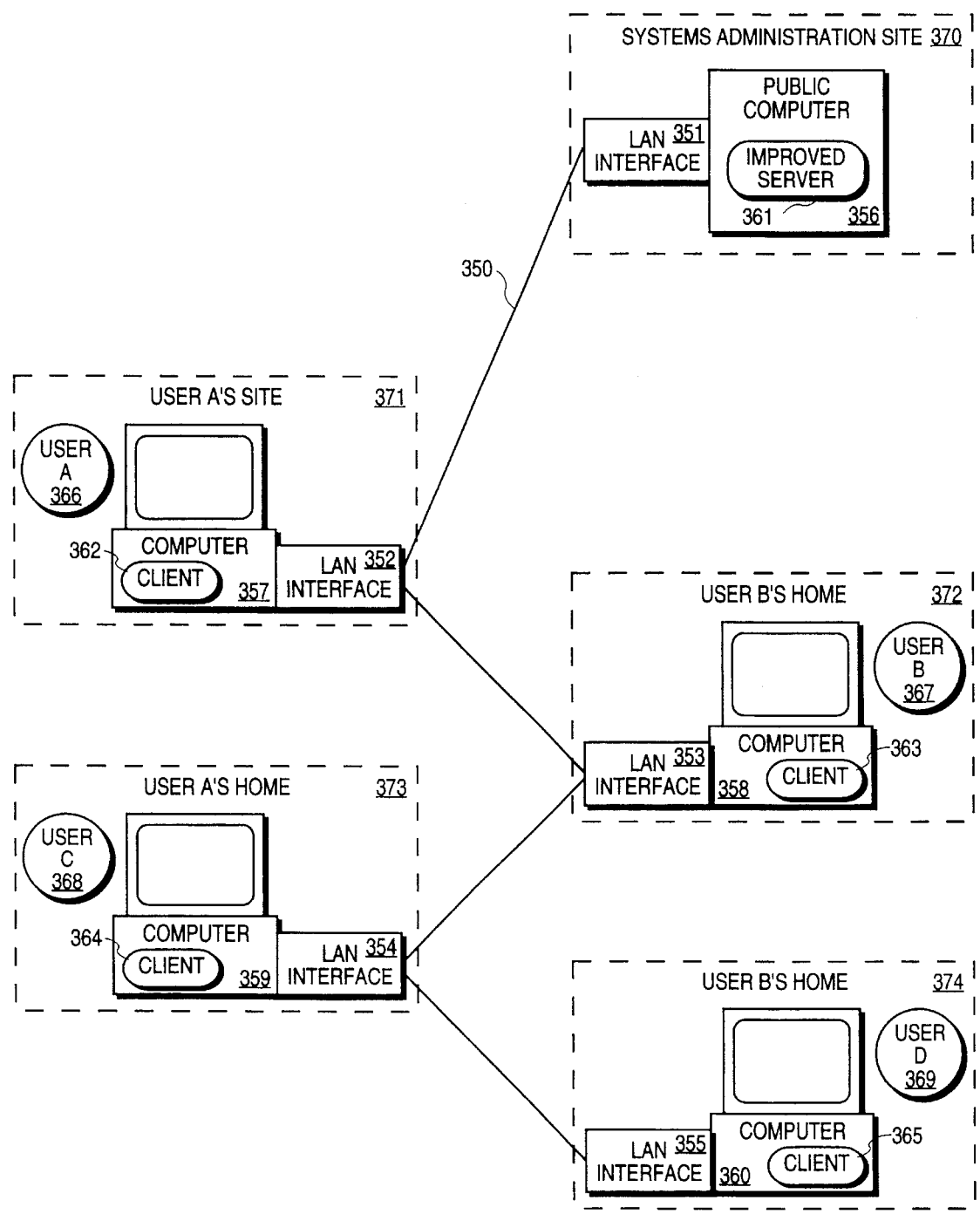
FIG. 29 illustrates the present invention as used with a local area network (LAN).

Referring to FIG. 29, an example of a small LAN installation is illustrated. In LAN configuration 350 there is a LAN Interface (351–355) rather than a modem to connect each user's computer to the network. In a LAN installation, users are typically in offices or rooms rather than in different homes. Thus, the location of the Users (366–369) are genetically labeled as "sites" (371–374). Also, it is quite common to have publicly accessible computers (such as 356) connected to the LAN that function as public file servers or on-line systems. Such systems can be located anywhere the LAN reaches, but are typically located at some systems administration site 370.

LANs are similar to WANs in that they provide data links between computers at disparate locations; but, there are significant differences between LANs and WANs. Among these differences: 1) the connect-time cost of the LAN is extremely low compared to that of a WAN, and 2) the latency is usually quite low, both in absolute terms and compared to a WAN. In fact, in the case of many new LAN protocols (e.g. FDDI and IEEE P1394), there are isochronous channels defined that provide guaranteed bandwidth and latency.

Figure 18:
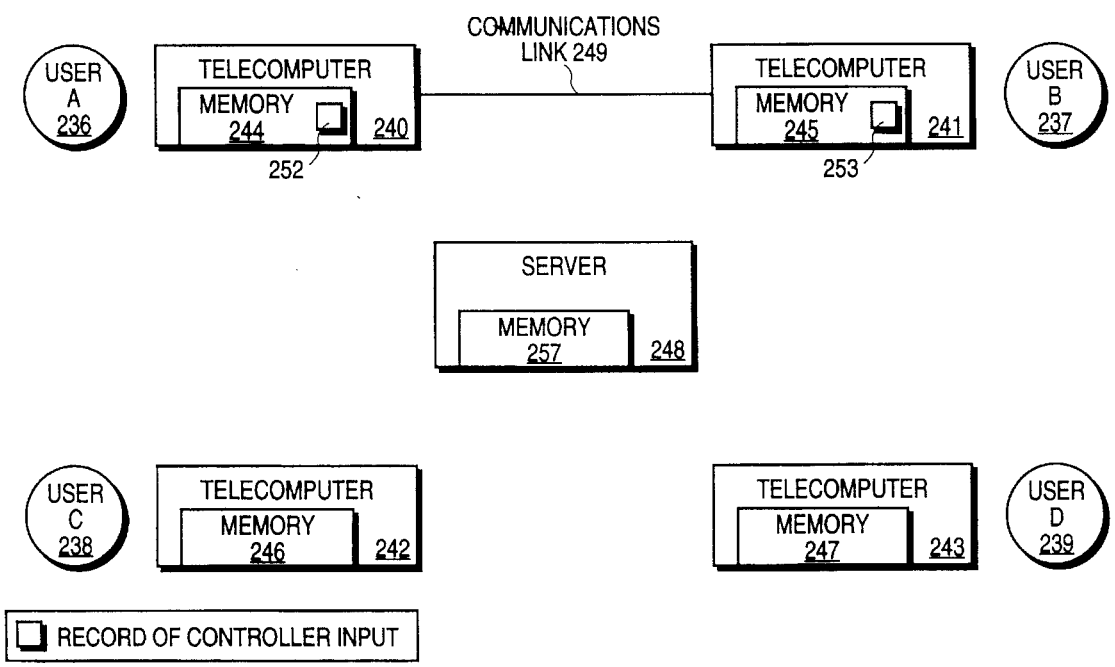
FIGS. 18–21 illustrate an example of recording and replaying game information over the network of the present invention.

Thus, in a LAN configuration versus a WAN configuration, there is much less of a reason, in performance or economic terms, for clients to disconnect from the network after finding a matched player and reconnect through a telephone call to play a twitch multi-player video game. Therefore, unlike the WAN 87 of the improved network of FIG. 2, the LAN 350 shown in FIG. 18 is suitable for carrying both the initial client (362–365) to server 361 interaction for finding a suitable opponent or opponents and suitable for maintaining the data link between two (or among several) of the computers (357–360) during the play of a multiplayer twitch video game.

Of course, many of the same matchmaking issues apply in a LAN environment as in a WAN environment: 1) the system must find a suitable opponent, 2) it must keep track of wins and losses, and 3) it must handle the situation when a user maliciously disconnects. But, many of the difficulties of utilizing a residential telephone line are eliminated in a LAN environment; because, the LAN was installed for the purpose of computer-to-computer communication. It is typically easier to connect to a Public computer 356, find a matching opponent or matching multiple players, and then establish a direct connection with the appropriate players for the game. There may not be a need to disconnect from the Public computer 356, because, most LANs are capable of maintaining several simultaneous connections.

One advantage that telephone-based direct connections (such as those shown in FIG. 2) have over LAN-based direct connections is that LANs can become overloaded with too many simultaneous users, resulting in high and often erratic latency. This is less true with newer LANs that provide isochronous channels, but even in these newer LANs, there is still a maximum overall user bandwidth that the network can sustain before simply being unable to handle more simultaneous users. The typical conventional telephone network, in contrast, can handle an almost arbitrarily high number of simultaneous users (e.g. it is extremely rare that a telephone call in the United States does not get through due to a busy network).

Thus, in a LAN environment, the implementation of a matching and connection system for multiple player twitch games is considerably easier than in a telephone network-based network; but, a LAN does have an upper limit to the number of simultaneous users it can support with low latency connections.

Recording and Replaying of Video Games

One important aspect of tournament game play is the opportunity for players to watch the play of potential future opponents in a match against another person. In this way, the potential future opponent can be "sized up," her strengths and weaknesses observed and analyzed, while strategies against her can be formulated.

In real tournament play, be it sports, chess, or video games, there is usually an opportunity to watch a match played by a potential future opponent, either by sitting in the audience to watch the match or by viewing a video tape of the match at a later date.

However, when video games are played through networks and the potential future opponents are essentially anonymous entities, there is no opportunity to watch future opponents play, except of course to play them yourself; but, by then it is too late. One way to provide an opportunity to "size up" a potential future opponent is described in the following section.

Referring to FIG. 18, a USER A 236 and a USER B 237 are playing a two-player video game with each other on computers (in this example "computer" is defined to be a computer equipped with a communications interface, such as a modem or ethernet interface) 240 and 241, respectively, connected through communications link 249 (a telephone line or other communications means). At least one computer 240 or 241 has a writeable memory 244 or 245. During the course of the video game, at least one computer 240 or 241 records in the memory 244 or 245 a record 252 or 253 of the controller input of USER A 236 and USER B 237 throughout the course of the video game. Thus, by the end of the video game, there is a complete record 252 or 253 through time of the controller input of both players (i.e. a time-sequential record of every button press, joystick actuation, etc.) throughout the course of the video game.

Figure 19:
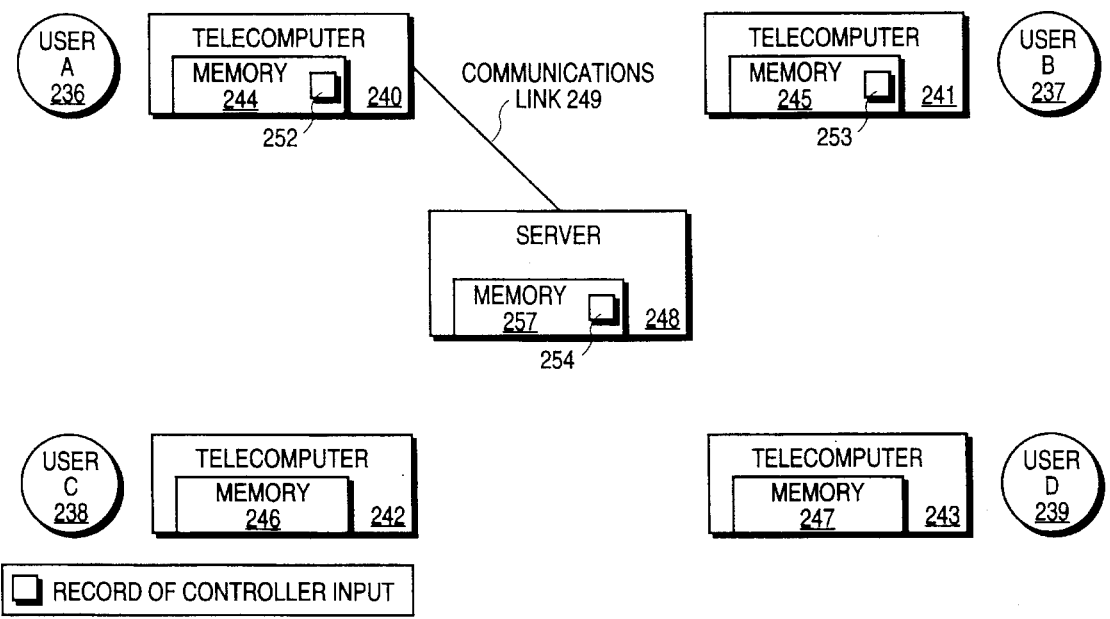

Referring now to FIG. 19, at some point after the video game has ended, at least one of the computers (240 in this example) connects to a server 248, using a technique described earlier, and uploads the record of controller input 252. The server 248 then stores a copy 254 of the record of controller input 252 in server memory 257.

Figure 20:
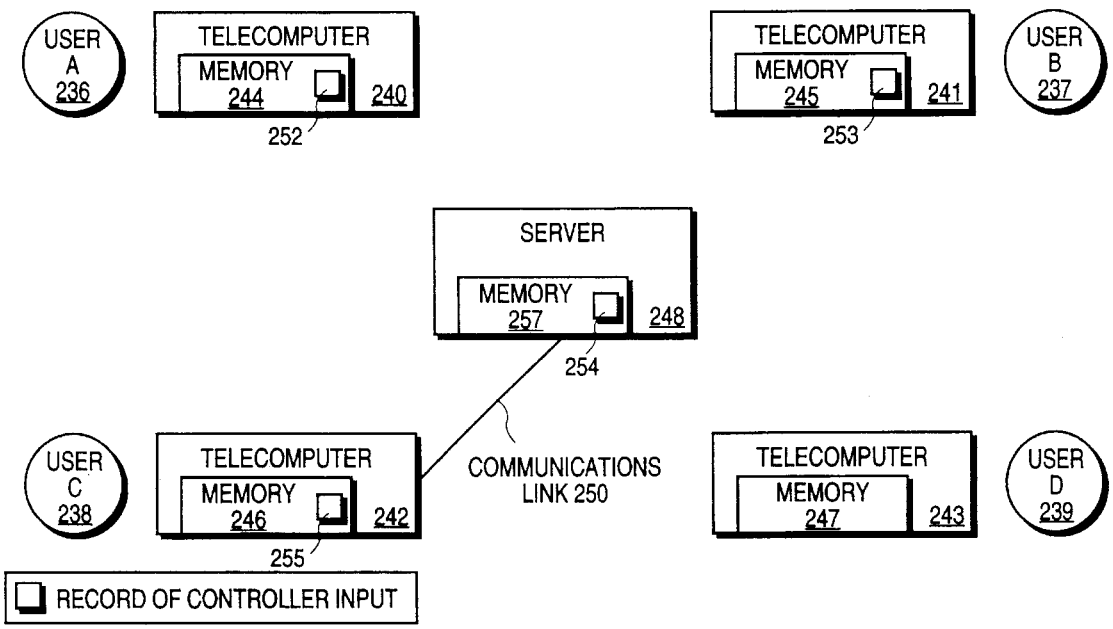

Referring now to FIG. 20, at some point after the record of controller input 252 has been uploaded to server 248, another computer 242 with writeable memory 246 connects to server 248 and downloads the copy 254 of the record of controller input 252, thereby storing another copy 255 in its memory 246 of computer 242.

Figure 21:
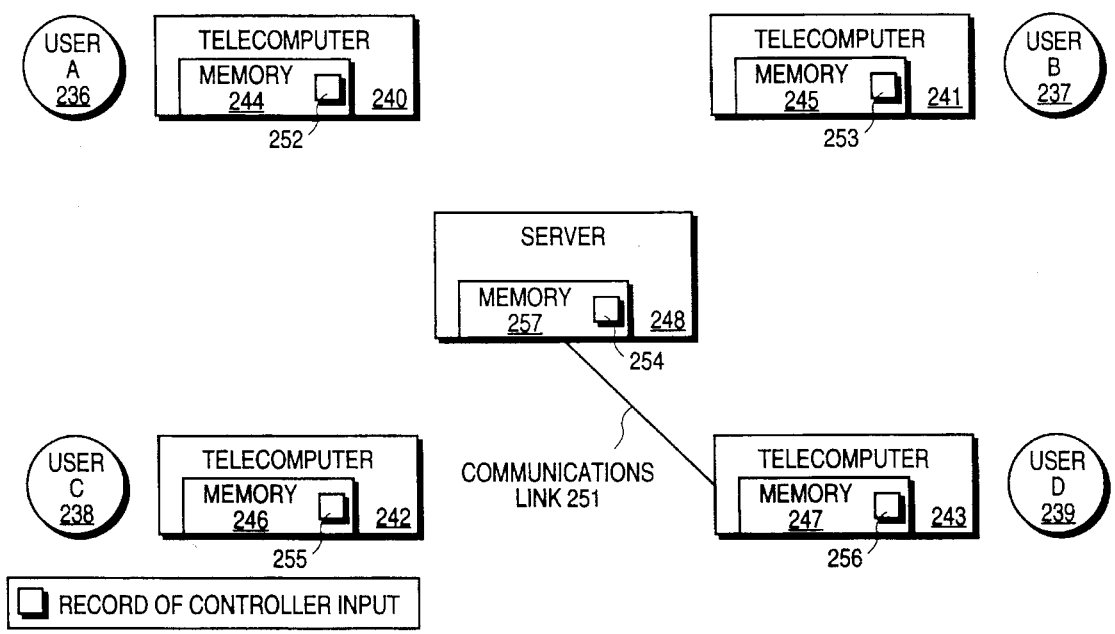

Referring now to FIG. 21, after downloading the copy 255 of the record of controller input 252, computer 242 executes the same video game program that had been executed by computers 240 and 241 in FIG. 18 when USER A 236 and USER B 237 played each other and produced the record of controller input 252. Computer 242 substitutes the controller input data recorded in copy 255 for the controller input of the video game program, instead of accepting controller input from USER C 238 and an opponent during execution of the video game. In this way, an exact re-enactment or "playback" of the video game originally played by USER A 236 and USER B 237 in FIG. 18 is executed on computer 242, giving User C 238 an opportunity to watch the play of the video game.

Of course, once a record of controller input 252 has been uploaded to server 248 into copy 254 in server memory 257, any number of computer users can subsequently download the record of controller input 254. In FIG. 21, another such User D 239 with computer 243 is shown downloading copy 254 into copy 256 while User C 238 is playing back a previously downloaded copy 255 of the same record produced by the game previously played by User A and User B.

In this manner, players can "size up" potential opponents, by downloading recorded controller input of previous games played and watching the previous games re-enacted on their own computers. The players can play back the games as many times as desired, possibly even controlling such playbacks with slow motion or fast-forward to study the playing strategy of their future opponents.

Although it might appear that a complete record of the controller actions of a player and an opponent would result in a large amount of data to be stored and transmitted, it is actually the case that 1) human-driven controller action is typically low bandwidth data to start with, and 2) such data is highly compressible using well known data compression techniques. Consider the following example: Controllers are typically read once per video frame time, or typically for NTSC video, 60 times per second. A 16-bit word is more than adequate to represent the instantaneous state information of a "SEGA GENESIS™" or "SUPER NINTENDO ENTERTAINMENT SYSTEM™" controller. In a two-player game, each controller is sampled no more than once per frame time, resulting in no more than 32 bits (4 bytes) per frame. In the course of a 10 minute game, this results in a maximum of 10 minutes×60 seconds×60 frames×4 bytes =144,000 bytes. This data can be readily compressed. For example, while the controller data may be sampled every video frame time, it is impossible for a human being to toggle a controller button every frame time, or for that matter every other frame time. Moreover, it is rarely the case that all of the buttons on the controller change at once. More typically, most of the buttons stay in the same state and a few buttons change state for any given transition. Given such data characteristics, a 4:1 data compression ratio can be readily achieved, resulting in 36,000 bytes (in the 10 minute game example). 36,000 bytes is a relatively modest storage requirement, given modern memory systems. With a standard V.32turbo (19.2 Kbit/sec modem) 36,000 bytes can be transmitted in 36,000 bytes÷19200 bits/sec×10 bits/byte (given the typical 1 start bit, 8 data bits, 1 stop bit)=18.75 seconds.

The same recording mechanism just described can also be applied to multi-player (i.e. more than two player) video games. As with the two-player case, at least one of the players' computers must record the controller inputs of all players and upload it to the server.

A variant to the above described recording mechanism is for some players to record some of the controller inputs and other players to record other controller inputs. This might be useful in the case, for example, where the memory, such as 244, is in short supply, or if the algorithm for compressing the controller input data can not be executing while the video game is running. One natural subdivision of the recording task is for each computer to record the controller input of its own USER. Of course, the recording task can be subdivided in whatever way is convenient. When the recording task is subdivided across more than one computer, all of the computers recording portions of the controller input must connect to the server to upload their data. The server, which presumably has far more storage capacity than an individual computer, must then take the various pieces of recorded data from each individual computer and assemble them together so they could be downloaded as one complete record of player game interaction.

Another variant to the above described recording mechanism is to record some other data stream as well as, or instead of, the controller input that, upon playback, is fed back into the video game program to re-enact a given execution sequence. There are several reasons why this approach may be desirable. 1) In many cases, it will take more than time-sequenced controller input to drive a video game program to follow a predictable execution. For example, if the video game uses pseudo-random numbers, it is essential that the initial random number seed used by the video game program is recorded as well as the controller input. This random number seed is fed into the video program prior to playback. 2) There may exist a more compact stream of game state information than controller input that defines the execution sequence of a video game program. If such a compact data stream exists, it is preferable to store and transmit this data stream than the larger record of controller input.

Thus, a mechanism for recording a twitch two-player game, making the recording available to other players, and then playing back the recorded game has been shown.

Real-time Transmission of Video Games

Although the methods for recording and later playback of video games previously described is very useful and economical, there are circumstances in which it may be desirable to capture the play interaction of a two-player video game and transmit the interaction in real-time, even given additional equipment and connection costs. An example of such a situation is a key match between two top-rated players in a tournament where other players are interested in watching the game played between the two top-rated players as the game is played. The following describes a mechanism by which such real-time transmission of a two-player video game is accomplished.

Figure 30:
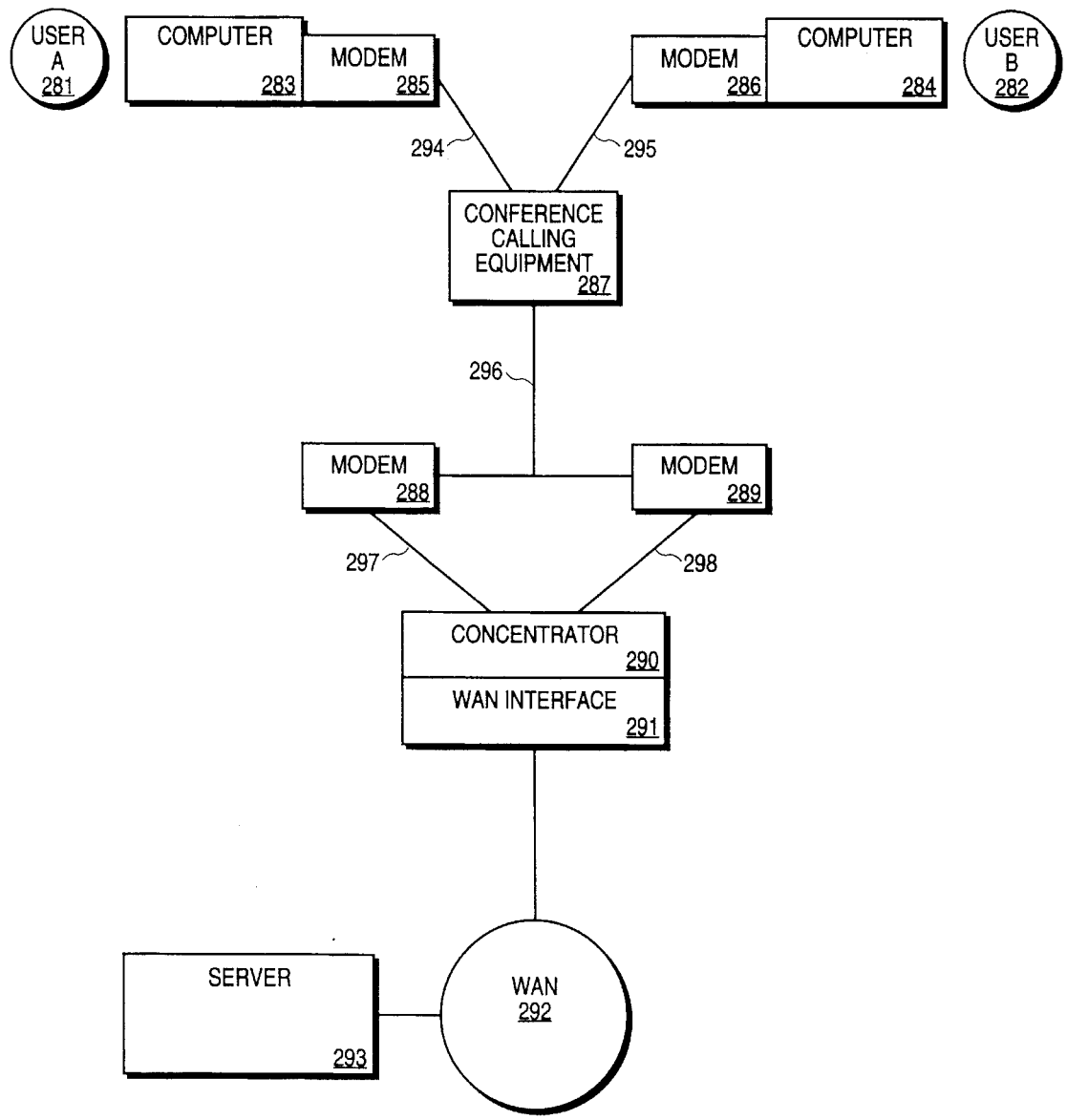
FIG. 30 illustrates the network architecture for a real-time game transmission.

In FIG. 30, USERS A 281 and B 282 are matched to play a video game together on their respective computers 283, 284 with modems 285, 286 using the methods previously described. The controller actuations of each player and/or other video game state information as needed is to be transmitted in real-time to server 293 so that server 293 can retransmit the state information to other computers with modems logged into the server 293 that will then play out the same video game in real-time.

Rather than one of the computers 283 or 286 of USERS A 281 or B 282 calling the other computer to establish a connection, both computers 283 and 284 call via telephone calls 294 and 295 into a site equipped with conference calling equipment 287. Additionally, two modems 288 and 289 are coupled to conference calling equipment 287 on the same line. These modems 288 and 289 are configured to receive only: the first receive modem 288 is configured to receive the modulated data from modem 285 and the second receive modem 289 is configured to receive the modulated data from modem 286. Modems 285 and 286 connect to each other through conference calling equipment 287 and modems 288 and 289 "listen in" to the communicated data between modems 285 and 286.

The data thus captured by modems 288 and 289 is then transmitted via communications links 297 and 298 to concentrator 290 where the two data streams are merged in a single data stream. Concentrator 290, through WAN interface 291 and WAN 292, then transmits the merged data stream to server 293.

Server 293 may then retransmit the merged data stream, as it is being received (or at a later time) to other computers (not shown in FIG. 30) logged in to the server 293. Thus, other computers may utilize the received video game state information in real-time to execute a video game that matches the game being played by USERS 281 and 282. In this manner, a two-player video game may be captured and transmitted in real-time.

The same technique, of course, can be applied to a multi-player (more than two player) video game being played through a conference call (such as described previously) by tying in the receiving modems to the conference call.

Simultaneous Voice and Data

One dimension of multi-player video game play is the verbal interaction among players. This dimension is generally lost when a multi-player video game is played through networks.

A product has been announced by "P.F. MAGIC™", Inc. called the "EDGE"™ that is a modem that plugs into a Sega, Inc. Genesis video game system. The "EDGE™" incorporates a modem technology, trademarked as "VOICESPAN™," that modulates voice and data simultaneously on a single telephone line. With a microphone and headset attached to the "EDGE™", players are able to play two-player video games over telephone lines and still remain in voice contact with each other.

There are several fundamental limitations to the Edge product. 1) Although the "EDGE™" product is capable of two-player real-time game play, it works only through a direct connection made between two people who know each other's telephone number and are both available to play the same game at the same time. This issue is discussed in detail in the Background section of the present patent application. 2) The "EDGE™" product is capable of networked game play utilizing a prior art network such as that shown in FIG. 1; but, as discussed previously, this results in high network cost and higher latency than twitch video games can tolerate. 3) The basic "EDGE™" product utilizes the standard "SEGA GENESIS™" controllers, which do not provide numeric or alphabetic input; this makes it awkward for users to enter phone numbers and names. 4) The technology to achieve simultaneous voice and data used in the "EDGE™" product is proprietary (i.e. not a CCITT modem protocol) and quite expensive, resulting in a product cost substantially higher than the product cost of the "SEGA GENESIS™" Sega Genesis video game system itself. 5) The "EDGE™" is not capable of supporting more than two-site multi-player games.

An improved video game modem as used in the preferred embodiment of the present invention solves these problems. Such an improved video game modem is described below.

The improved video game modem of the present invention includes the improved client software, such as that described previously (e.g. FIGS. 4–7, 133 and 137). This improved client automatically connects the video game to an improved network such as that described previously (e.g. FIG. 2). In this manner, the user of the video game system utilizing the improved video game modem enjoys all the advantages of a real-time, low-cost, matchmaking network, without the disadvantages of prior art methods of finding a suitable opponent. These disadvantages are described in the Background section of the present patent application. Also, because the matchmaking process of the present invention is largely automatic, the user is not required to enter extensive alphanumeric data with existing video game controllers. In addition to these advantages, by use of the improved video game modem of the present invention, video game players can now interact verbally while playing the video game together utilizing simultaneous voice and data technology as described in the following section.

As a way of reducing cost while maintaining simultaneous voice and data capability, the improved video game modem of the present invention uses standard CCITT modem protocols rather than a proprietary protocol. Standard protocols result in economies of scale as well as better price negotiating leverage; because, there are many sources for components.

Modern modem protocols can achieve 14.4 Kbits/sec (CCITT V.32bis), 19.2 Kbits/sec (V.32 Turbo), and 28.8

Kbits/sec (V.fast) full duplex. Using Adaptive Delta Pulse Code Modulation (ADPCM) techniques as well known in the art, it is possible to compress acceptable quality speech from the telephone standard data rate of 64 kbits/sec down to 16 Kbits/sec with a relatively modest computational overhead (compared to the complexity of the modem algorithm itself). Even at lower ADPCM data rates than 16 Kbits/sec, discernable speech (adequate for video game play) is achievable. Thus, it is quite reasonable to compress speech using standard ADPCM techniques, utilize a standard CCITT modem protocol, and transmit the speech utilizing only a portion of the available modem bandwidth. As discussed previously, even 300 bits/sec of bandwidth is adequate for many video games. Therefore, by way of example, if 16 Kbit/sec ADPCM speech were transmitted on a 19.2K bits/sec (V.32 Turbo) channel, 19,200−16,000 =3,200 bits/sec of data would be available for game play, ten times the amount usually required. Of course, other well-known speech compression techniques can be utilized (e.g. silence elimination, CELP) so as to reduce the percentage of the modem channel required for speech.

Another advantage of implementing a simultaneous speech and data modem as described in the preceding paragraph is that the speech channel in each direction is isolated from the speech channel in the opposite direction, unlike an analog speech channel (such as a standard telephone channel). This feature offers significant advantages in controlling acoustic feedback if the speech is output into a room through a loudspeaker (such as the home television's speaker). This feature can also offer opportunities for video games to treat incoming and outgoing speech independently.

Figure 15:
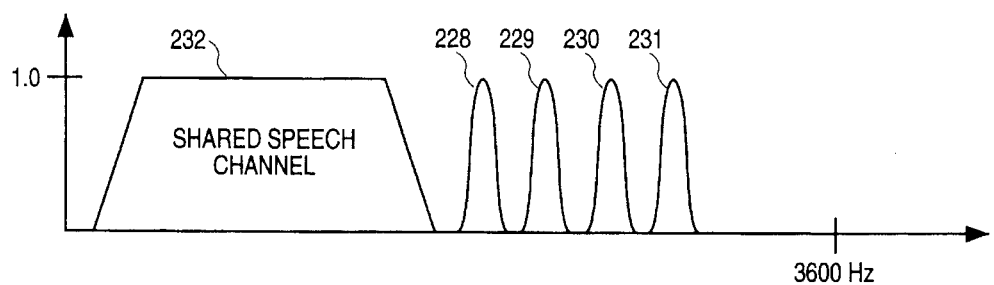
FIG. 15 illustrates the modulation band allocation for a voice/data conference modem of the present invention.

To support mult-site, multi-player games, the improved video game modem of the present invention implements the multi-site, multi-channel conference call technique described previously in connection with FIGS. 12 and 13 in addition to its standard CCITT modem protocols. The multi-site, multi-channel conference call modem previously described does not provide simultaneous voice capability; because, the bandwidth of each individual channel is too low. An improvement on this multi-channel technology is shown in FIG. 15. In this example, four modem channels or modulation bands (228–231) are allocated to the upper frequencies of a telephone channel while a single shared speech channel or modulation band 232 is allocated to the lower frequencies. The four modem channels (228–231) are implemented and utilized in the same manner as described previously and as shown in FIG. 13.

Figure 16:
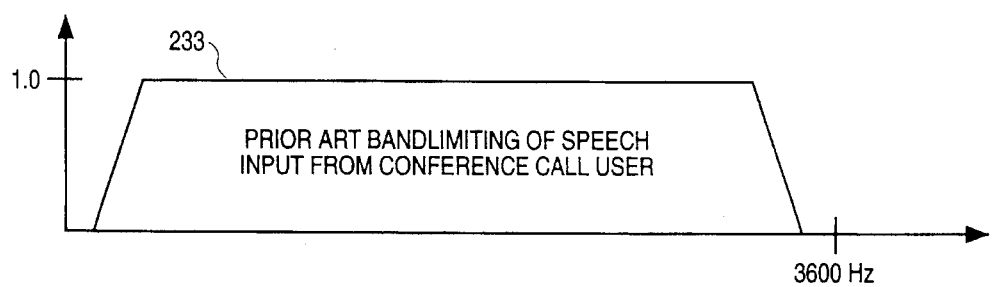
FIG. 16 illustrates the prior art method of band limiting for conference call user speech.
Figure 17:
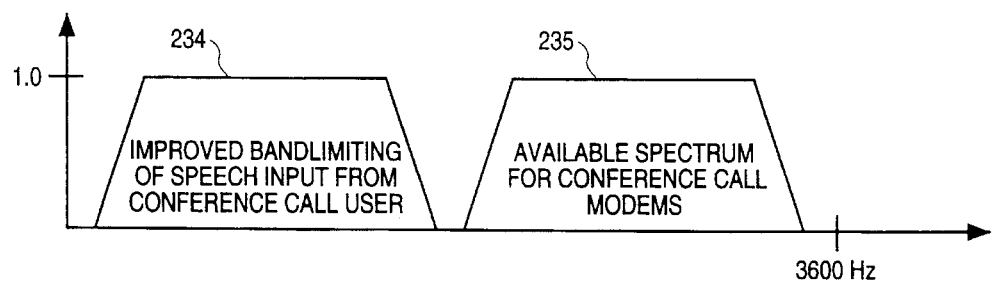
FIG. 17 illustrates the improved method for band limiting for conference call user speech to allow simultaneous multi-site modems.

The speech channel 232 is implemented as follows. Normally, the speech input of a user of a conference call is bandlimited to the bandwidth of the entire telephone channel 233 as shown in FIG. 16. This bandlimiting either occurs in the telephone set or in the telephone network. As illustrated in FIG. 17, the user's speech input during a conference call is bandlimited in the improved modem of the present invention to some fraction 234 of the entire telephone channel bandwidth. In this manner, a different portion of the telephone channel bandwidth 235 is available for multiple modem channels, such as channels (228–231) shown in FIG. 15. Although the resulting speech bandwidth is less than ideal telephone speech, the frequencies most essential to understanding speech are typically the lower frequencies. In fact, a common data compression technique for speech is to simply sample the speech at half speed, resulting in half bandwidth, but still quite understandable, speech.

Just as in a normal conference call, the shared speech channel 232 of FIG. 15 is an open channel. Anything spoken on the channel 232 is heard by all parties. Also, if two parties speak at once, they would be speaking over each other. The video games can make use of this characteristic, either allowing an open channel that the players have to decide how to share, or by limiting the times when players may speak or listen to the channel. The control information to synchronize such capability is passed through the data channels in the upper bands.

The shared speech channel 232 could also be used as a single 1-to-1 or 1-to-many high-speed data channel. For example, there may be video game situations where a private voice message may be sent from one user to another user, or from one user to several other users. For this situation, the modem of the user who is speaking could take control of the shared speech channel 232, and transmit digitized speech using a high-bandwidth modulation protocol. The modems of all users on the conference call intended to receive the voice message would demodulate the high-speed channel and thereby receive the speech. By switching control of the shared speech channel 232 from one user to the next, with whomever is transmitting speech at a given moment modulating on the shared speech channel 232, the shared speech channel 232 can be shared among multiple users, although only one user may transmit speech at a given moment. Since the other channels 228–231 would continue to be in operation, synchronization information regarding the sharing could be sent among the various users on the conference call.

Clearly, the multi-site modem with a shared speech channel shown in FIG. 15 has fewer data channels (or lower bandwidth per channel) than the multi-site modem shown in FIG. 13. However, this disadvantage could be mitigated somewhat by either further limiting the bandwidth of the speech, or by cutting out the speech channel altogether during high-bandwidth data intervals of a video game.

Thus, an improved simultaneous voice and data modem for video games has been described.

The specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

I claim:

1. A first computer for directly linking said first computer with a second computer, said first computer also for recording the video game interaction between a first player on said first computer and a second player on said second computer, said first computer comprising:

a network interface coupled to a network;

client application software executing in said first computer, said client application software including:

processing logic for connecting said first computer to a server on said network via said network interface;

processing logic for requesting said server to match said first computer with a second computer using matching criteria;

processing logic for receiving a network address of said second computer from said server;

processing logic for disconnecting said first computer from said server before establishing a direct communication link with said second computer using said network address;

processing logic for saving game information on said first computer, indicative of the interaction between said first player on said first computer and said second player on said second computer;

processing logic for reconnecting said first computer to a server coupled to said network; and processing logic for uploading said game information from said first computer to a server memory coupled to said server.

2. The first computer as claimed in claim 1 wherein said client application software further includes:

processing logic for downloading said game information from said server memory to said first computer; and processing logic for providing said game information in place of input from said first player on said first computer for the execution of said video game on said first computer.

3. The first computer as claimed in claim 1 wherein said client application software further includes processing logic for compressing said game information prior to uploading said game information to said server memory.

4. The first computer as claimed in claim 1 wherein said game information includes game controller information from said first player on said first computer and said second player on said second computer.

5. The first computer as claimed in claim 1 wherein said game information includes game controller information from only one of said first player on said first computer and said second player on said second computer.

6. The first computer as claimed in claim 1 wherein said game information includes information other than game controller information.

7. The first computer as claimed in claim 1 wherein said game information includes information other than game controller information in addition to game controller information.

8. A system for directly linking a first computer to a second computer, said system also for recording the video game interaction between said first player on said first computer and said second player on said second computer, said system comprising:

a network;

a first computer coupled to or previously coupled to said network;

a server coupled to said network, said server including:

processing logic for receiving a request for direct linking from said first computer;

processing logic for matching said first computer with a second computer using matching criteria;

processing logic for sending a network address of said second computer to said first computer;

client application software executing in said first computer, said client application software including:

processing logic for connecting said first computer to a server on said network via said network interface;

processing logic for requesting said server to match said first computer with a second computer using matching criteria;

processing logic for receiving a network address of said second computer from said server;

processing logic for disconnecting said first computer from said server before establishing a direct communication link with said second computer using said network address;

processing logic for saving game information indicative of the interaction between a first player on said first computer and a second player on said second computer;

processing logic for reconnecting said first computer to said server; and processing logic for uploading said information from said first computer to said server memory.

9. The system as claimed in claim 8 wherein said second computer is coupled to or previously coupled to said network, said system further including:

client application software executing in said second computer, said client application software including:

processing logic for downloading said game information from said server memory to said second computer; and processing logic for providing said game information in place of input from said second player for the execution of said video game.

10. The system as claimed in claim 9 wherein said first computer and said second computer are identical.

11. The system as claimed in claim 9 wherein said server captures said game information while a game is being played and downloads said game information to other computers.

12. A first computer for directly linking said first computer to a second computer, said first computer also for replaying video game interaction between a first player on a first computer and a second player on a second computer, said first computer comprising:

a network interface coupled to a network;

client application software executing in said first computer, said client application software including:

processing logic for connecting said first computer to a server coupled to said network;

processing logic for downloading stored game information from a server memory coupled to said server;

processing logic for providing said game information in place of input from said first player for the execution of said video game.

13. The first computer as claimed in claim 12 wherein said client application software further includes processing logic for uploading said game information from said first computer to said server memory.

14. The first computer as claimed in claim 12 wherein said client application software further includes processing logic for decompressing said game information after downloading said game information from said server memory.

15. The first computer as claimed in claim 12 wherein said game information includes game controller information from said first player on said first computer and said second player on said second computer.

16. The first computer as claimed in claim 12 wherein said game information includes game controller information from only one of said first player on said first computer and said second player on said second computer.

17. The first computer as claimed in claim 12 wherein said game information includes information other than game controller information.

18. The first computer as claimed in claim 12 wherein said game information includes information other than game controller information in addition to game controller information.

19. A system for directly linking a first computer to a second computer, said first computer also for replaying the video game interaction between a first player on said first computer and a second player on said second computer, said system comprising:

a network;

a server coupled to said network, said server including a server memory;

a first computer coupled to or previously coupled to said network;

client application software executing in said first computer, said client application software including:
processing logic for connecting said first computer to a server coupled to said network;
processing logic for downloading said game information to said first computer from a server memory coupled to said server; and
c) processing logic for providing said game information in place of input from said first player for the execution of said video game.

20. The system as claimed in claim 19 wherein said second computer is coupled to or previously coupled to said network, said system further including:

client application software executing in said second computer, said client application software including processing logic for uploading said game information to said server memory from said second computer.

21. The system as claimed in claim 20 wherein said first computer and said second computer are identical.

22. The system as claimed in claim 19 wherein said server captures said game information while a game is being played and downloads said game information to other computers.

\* \* \* \* \*